United States Patent
Gao et al.

(10) Patent No.: US 9,538,481 B2
(45) Date of Patent: Jan. 3, 2017

(54) UPLINK POWER CONTROL METHOD, POWER CONTROL PARAMETER CONFIGURATION METHOD AND APPARATUS THEREOF

(75) Inventors: Xuejuan Gao, Beijing (CN); Zukang Shen, Beijing (CN); Xueming Pan, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 13/978,530

(22) PCT Filed: Jan. 6, 2012

(86) PCT No.: PCT/CN2012/070115
§ 371 (c)(1),
(2), (4) Date: Jul. 8, 2013

(87) PCT Pub. No.: WO2012/092878
PCT Pub. Date: Jul. 12, 2012

(65) Prior Publication Data
US 2013/0286948 A1    Oct. 31, 2013

(30) Foreign Application Priority Data

Jan. 6, 2011  (CN) .......................... 2011 1 0001900

(51) Int. Cl.
*H04W 52/18* (2009.01)
*H04W 52/14* (2009.01)
(Continued)

(52) U.S. Cl.
CPC ............ *H04W 52/18* (2013.01); *H04L 1/0041* (2013.01); *H04L 1/0057* (2013.01); *H04L 1/0073* (2013.01);
(Continued)

(58) Field of Classification Search
None
See application file for complete search history.

(56) References Cited

U.S. PATENT DOCUMENTS

2010/0195587 A1\* 8/2010 Ratasuk et al. ............... 370/329
2010/0246463 A1\* 9/2010 Papasakellariou et al. .. 370/311
(Continued)

FOREIGN PATENT DOCUMENTS

CN    101588226 A    11/2009
CN    101702823 A    5/2010
(Continued)

OTHER PUBLICATIONS

International Search Report for PCT/CN2012/070115, mailed Apr. 12, 2012.
(Continued)

*Primary Examiner* — Wei Zhao
*Assistant Examiner* — Ronald H Davis
(74) *Attorney, Agent, or Firm* — Oliff PLC

(57) ABSTRACT

Disclosed are an uplink power control method, power control parameter configuration method and apparatus thereof. The uplink power control method comprises: a user equipment receives data in M downlink sub-frames of N downlink carriers and generates uplink control information, wherein the uplink control information of the M downlink sub-frames is transmitted in one uplink sub-frame; the user equipment determines ΔF_PUCCH(F) and h(n) for calculating the transmit power of a physical uplink control channel (PUCCH) according to whether the number of bits of the uplink control information is larger than a predefined threshold; ΔF_PUCCH(F) represents the power offset of different PUCCH formats relative to the PUCCH format 1a, h(n) represents the power offset corresponding to the number of transmission bits of the PUCCH; the user equipment
(Continued)

calculates the PUCCH transmit power according to ΔF_PUCCH(F) and h(n), and sending the uplink control information on the PUCCH using the calculated transmit power. The present invention can improve the accuracy of power control, thus enhance the transmission performance of the uplink control information.

14 Claims, 8 Drawing Sheets

(51) Int. Cl.
*H04W 52/28* (2009.01)
*H04W 52/32* (2009.01)
*H04W 52/42* (2009.01)
*H04L 1/16* (2006.01)
*H04L 1/00* (2006.01)

(52) U.S. Cl.
CPC .......... *H04L 1/1692* (2013.01); *H04W 52/146* (2013.01); *H04W 52/286* (2013.01); *H04W 52/325* (2013.01); *H04W 52/42* (2013.01); *H04L 1/0026* (2013.01); *H04L 1/0031* (2013.01)

(56) References Cited

U.S. PATENT DOCUMENTS

| | | | |
|---|---|---|---|
| 2010/0246705 A1* | 9/2010 | Shin et al. | 375/267 |
| 2010/0325508 A1* | 12/2010 | Hu et al. | 714/749 |
| 2011/0038271 A1* | 2/2011 | Shin et al. | 370/252 |
| 2011/0075594 A1* | 3/2011 | Burstrom et al. | 370/280 |
| 2011/0096815 A1* | 4/2011 | Shin et al. | 375/219 |
| 2011/0141928 A1* | 6/2011 | Shin et al. | 370/252 |
| 2011/0243066 A1* | 10/2011 | Nayeb Nazar et al. | 370/328 |
| 2012/0213187 A1* | 8/2012 | Yang et al. | 370/329 |
| 2012/0294167 A1* | 11/2012 | Zhu et al. | 370/252 |
| 2012/0314603 A1* | 12/2012 | Wen et al. | 370/252 |

FOREIGN PATENT DOCUMENTS

| | | |
|---|---|---|
| CN | 101969685 A | 2/2011 |
| CN | 102045827 A | 5/2011 |
| WO | 2010/148319 A1 | 12/2010 |

OTHER PUBLICATIONS

International Preliminary Report on Patentability and Written Opinion of the International Searching Authority for PCT/CN2012/070115, mailed Apr. 12, 2012.

\* cited by examiner

UPLINK POWER CONTROL METHOD, POWER CONTROL PARAMETER CONFIGURATION METHOD AND APPARATUS THEREOF

CROSS REFERENCE TO RELATED APPLICATIONS

This application is the National Stage of PCT/CN2012/070115 filed on Jan. 6, 2012, which claims priority under 35 U.S.C. §119 of Chinese Application No. 201110001900.4 filed on 6 Jan. 2011, the disclosures of which are incorporated by reference. The international application under PCT article 21(2) was not published in English.

FIELD OF THE PRESENT INVENTION

The present invention relates to the field of wireless communication technology, in particular to the uplink power control method, power control parameter configuration method and apparatus thereof.

BACKGROUND OF THE PRESENT INVENTION

Currently, LTE-A (Long Term Evolution-Advanced) system can support CA (Carrier Aggregation) of five carriers at most, and one LTE-A UE (User Equipment) needs to feed back the ACK (ACKnowledgement)/NACK (Non-ACKnoledgement) feedback information corresponding to multiple downlink carriers and downlink sub-frame in the same uplink sub-frame. In order to avoid inconsistent understanding between eNB (eNodeB) and UE toward ACK/NACK codebook during packet loss, the ACK/NACK codebook to be fed back by UE on one uplink sub-frame shall be generated based on the maximum configuration: for FDD (Frequency Division Duplex) system, ACK/NACK codebook is decided by the total number of configured downlink carrier and the transmission mode of each downlink carrier, viz. UE needs to feed back N+N1 bit ACK/NACK in one uplink sub-frame, wherein N refers to the total number of configured downlink carrier number and N1 is the downlink carrier number with transmission mode of multi-codeword; as for TDD (Time Division Duplex) system, ACK/NACK codebook depends on the total number of configured downlink carrier number, transmission mode of each downlink carrier and the total number of downlink sub-frame of UE performing ACK/NACK feedback on the same uplink sub-frame, viz. UE shall feed back M×(N+N1) bit ACK/NACK on one uplink sub-frame, wherein M refers to the total number of downlink sub-frame number performing ACK/NACK feedback on the same sub-frame, for different uplink/downlink configuration and uplink sub-frame, M varies, viz. number of K in each column of Table 1. Besides, M may be different for various carriers, then UE shall feed back $$\sum_{i=1}^{N} C_i \cdot M_i$$

bit ACK/NACK in one uplink sub-frame, wherein, $C_i$ is the codeword number corresponding to the transmission mode of carrier i, $C_i=1$ for single codeword transmission mode and $C_i=2$ for multi-codeword transmission mode is, $M_i$ refers to the total number of downlink sub-frame performing ACK/NACK feedback on the same uplink sub-frame on carrier i, which is decided by uplink/downlink configuration of carrier i. As for downlink carrier and/or downlink sub-frame position without scheduling in the AK/NACK codebook, NACK/DTX (Discontinuous Transmission) will be generated as feedback information.

TABLE 1

Downlink Association Set Index K: $\{k_0, k_1, \ldots k_{M-1}\}$ for TDD

| Uplink/Downlink configuration | Sub-frame number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In order to support larger ACK/NACK codebook transmission, LTE-A system defines a new PUCCH (Physical Uplink Control Channel) transmission format PUCCH format 3. It at most supports 20 bits ACK/NACK feedback, as shown in FIG. 1. When the ACK/NACK information to be fed back by UE exceeds the aforementioned threshold, bundling shall be performed on ACK/NACK information, to make the codebook smaller than or equal to the aforementioned threshold, such as Spatial Bundling, Time-Domain Bundling or Frequency-Domain Bundling. PUCCH format 3 adopts different coding methods for different ACK/NACK codebooks. When ACK/NACK codebook is less than or equal to 11 bits, the RM (Reed-Muller) encoding of Rel-8 (Release-8) system is reused, viz. the ACK/NACK feedback bits shall be encoded into 48-bit coded bits through RM(32, O)+Repetition encoding method; when ACK/NACK codebook is larger than 11 bits, Dual-RM encoding method is adopted, as shown in FIG. 2, first the ACK/NACK feedback bits shall be divided into two groups averagely, then the ACK/NACK feedback bits of each group shall be encoded into 24-bit coded bits by adopting RM (32, O)+(Truncation) encoding method.

PUCCH power control in LTE-A system shall follow the power control method of LTE Rel-8/9 system as much as possible. The formula of defining PUCCH power control is as below:

$$P_{PUCCH}(i) = \min \begin{cases} P_{CMAX,c}(i), \\ P_{0\_PUCCH} + PL_C + h(n_{CQI}, n_{HARQ}, n_{SR}) + \Delta_{F\_PUCCH}(F) + \Delta_{T \times D}(F') + g(i) \end{cases} [dBm] \quad (1)$$

Wherein: $P_{CMAX,c}$ is the allowable maximum transmit power of carrier c, viz. for PUCCH it is the allowable maximum transmit power of the primary uplink carrier; $PL_c$ refers to path loss compensation value of carrier c, which is obtained by downlink carrier measurement of higher layer configuration;

$P_{O\_PUCCH}$ represents the target value of transmit power, composed of cell-specific part $P_{O\_NOMINAL\_PUCCH}$ and UE-specific part $P_{O\_UE\_PUCCH}$ of higher layer configuration; $h(n_{CQI}, n_{HARQ}, n_{SR})$ refers to the power offset corresponding to the number of various bits sent by PUCCH; wherein, $n_{CQI}$ corresponds to the number of CSI (Channel State Information) bit sent, CSI includes CQI (Channel Quality Indicator) information, PMI (Precoding Matrix Indicator) information, RI (Rank Indication) information, PTI (Precoding Type Indicator) information, etc., $n_{HARQ}$ corresponds to the number of ACK/NACK bit sent, and $n_{SR}\{0,1\}$ represents whether SR (Scheduling Request) transmission exists in the current uplink sub-frame; Configured by higher layer, $\Delta_{F\_PUCCH}(F)$ represents the power offset of different PUCCH formats relative to the PUCCH format 1a, the PUCCH formats include PUCCH format 1/1a/1b/2/2a/2b, PUCCH format 3 and other various formats, which is a further compensation to $h(n_{CQI}, n_{HARQ}, n_{SR})$ power control error; $\Delta_{TxD}(F')$ is configured by higher layer, with independent configuration for each PUCCH format, representing the power offset of different PUCCH formats with multi-antenna port transmission (viz. transmission diversity in Rel-10) mode;

g(i) is the accumulation of the power control commands.

Among all parameters mentioned in formula (1), the value of $h(n_{CQI}, n_{HARQ}, n_{SR})$ can be:

$h(n_{CQI}, n_{HARQ}, n_{SR})=0$ for PUCCH format 1a/1b;

As for PUCCH format 1b with channel selection (PUCCH format 1b based on channel selection), if multiple carriers are configured for UE, $$h(n_{CQI}, n_{HARQ}, n_{SR}) = \frac{(n_{HARQ}-1)}{2},$$

if only one carrier is configured for UE, $h(n_{CQI}, n_{HARQ}, n_{SR})=0$;

For PUCCH format 2/2a/2b, $$h(n_{CQI}, n_{HARQ}, n_{SR}) = \begin{cases} 10\log_{10}\left(\frac{n_{CQI}}{4}\right) & \text{if } n_{CQI} \geq 4 \\ 0 & \text{otherwise} \end{cases}$$

with normal CP (Cyclic Prefix) and $$h(n_{CQI}, n_{HARQ}, n_{SR}) = \begin{cases} 10\log_{10}\left(\frac{n_{CQI}}{4}\right) & \text{if } n_{CQI}+n_{HARQ} \geq 4 \\ 0 & \text{otherwise} \end{cases}$$

with extended CP;

As for PUCCH format 3, $$h(n_{CQI}, n_{HARQ}, n_{SR}) = \frac{n_{HARQ}+n_{SR}-1}{2}.$$

As the ACK/NACK codebook determined by UE based on its own configuration is always larger than the number of data package actually received by UE, esp. when multiple carriers are configured for UE, but eNB only schedules few or one carrier/sub-frame, the number of effective ACK/NACK bits (ACK/NACK codebook corresponding to the data packages actually received by UE or those with actual scheduling) in the ACK/NACK codebook is much less than the total bit number of the ACK/NACK codebook, and eNB can only detect the effective information part according to detail scheduling status, to improve detection performance, therefore, $h(n_{CQI}, n_{HARQ}, n_{SR})$ shall be calculated based on the effective codebook of UE: for ACK/NACK transmission without bundling scheme, it is agreed that $n_{HARQ}$ is determined based on number of the TB (Transport Block) actually received by UE and the number of the PDCCH indicating downlink SPS (Semi-Persistent Scheduling) resource release, so as to guarantee that the transmit power of UE in PUCCH corresponds to the number of downlink carrier and downlink sub-frame with actual scheduling, thus avoiding power waste; as for ACK/NACK transmission with bundling, the number of bits of bundled information actually transmitted by UE is smaller than the number of the TB actually received, so $n_{HARQ}$ shall be determined in accordance with the bundled codebook, to avoid UE power waste and reduce interference.

In the procedure of realizing the objects of the present invention, at least the following problems existing in the current technologies were found:

Considering that PUCCH format 3 adopts different RM encoding mode under different ACK/NACK codebooks, when ACK/NACK codebook is larger than 11 bits, ACK/NACK feedback information shall be divided into two groups, due to the randomization of eNB scheduling, the effective ACK/NACK bits in the ACK/NACK codebook cannot be certainly divided to each group uniformly, therefore ACK/NACK effective encoding rate of each group of RM encoding is different, thus reducing ACK/NACK detection performance. As shown in FIG. 3, when ACK/NACK codebook[b0, b1, . . . b11] is divided into two groups at the middle position of the codebook, all 6 bits in group I [b0, b1, . . . b5] are effective information, which means that the effective encoding rate is 6/24, in group II [b6, b7, . . . b11], only b6 and b7 are effective information and other bits refer to occupation information generated by UE, which means that the effective encoding rate is 2/24, thus reducing the overall ACK/NACK transmission performance. Grouping is not required for single-RM encoding, so performance reduction due to unbalanced effective information grouping does not exist.

Besides, PUCCH format 3 supports multi-antenna port transmission mode, and 2 antenna ports in Rel-10 adopts SORTD (Spatial Orthogonal Resource Transmit Diversity) as the transmission diversity scheme. Differences of transmission performance exist in SORTD and single-antenna port transmission.

It can thus be seen that, PUCCH format 3 adopts single-RM and Dual-RM to cause differences on transmission performance of different number of effective bits, and PUCCH format 3 also adopts a single-antenna port transmission mode and a multi-antenna port transmission mode to cause differences on transmission performance of different number of effective bits. The existing technologies have not yet proposed solutions of improving ACK/NACK transmission performance by improving accuracy of power control specific to such differences.

SUMMARY OF THE PRESENT INVENTION

The present invention is to put forward an uplink power control method, power control parameter configuration method and apparatus thereof, so as to increase the accuracy of power control, thus improving the transmission performance of uplink control information. Therefore, the embodiments of the present invention adopt the following technical solutions:

An uplink power control method, comprising:

A user equipment receives data in M downlink sub-frames of N downlink carriers and generates uplink control information, wherein N≥1, M≥1, and the uplink control information of the M downlink sub-frames is transmitted in one uplink sub-frame; The user equipment determines $\Delta_{F\_PUCCH}(F)$ and h(n) for calculating the transmit power of a physical uplink control channel (PUCCH) according to whether the number of bits of the uplink control information is larger than a predefined threshold; wherein, the $\Delta_{F\_PUCCH}(F)$ represents the power offset of PUCCHs in different formats relative to PUCCH format 1a, and the h(n) represents the power offset corresponding to the number of transmission bits of the PUCCH;

The user equipment calculates the PUCCH transmit power according to the determined $\Delta_{F\_PUCCH}(F)$ and h(n), and sends the generated uplink control information on the PUCCH using the calculated transmit power.

A user equipment, comprising:

Receiving module, used for receiving data in M downlink sub-frames of N downlink carriers; wherein N≥1 and M≥1;

Control information generation module, used for generating uplink control information of the M downlink sub-frames that can be transmitted in one uplink sub-frame;

Power control module, used to determine $\Delta_{F\_PUCCH}(F)$ and h(n) for calculating PUCCH transmit power according to whether the number of bits of the uplink control information generated based on the control information generation module is larger than a predefined threshold, and calculates the transmit power used to send the uplink control information on PUCCH based on the determined $\Delta_{F\_PUCCH}(F)$ and h(n); wherein, the $\Delta_{F\_PUCCH}(F)$ represents the power offset of PUCCHs in different formats relative to PUCCH format 1a, and the h(n) represents the power offset corresponding to the number of transmission bits of the PUCCH;

Sending module, used for sending the generated uplink control information on PUCCH by applying the calculated transmit power.

A power control parameter configuration method, comprising:

Network side configures $\Delta_{F\_PUCCH}(F)$ parameter of PUCCH transmit power to user equipment, and the $\Delta_{F\_PUCCH}(F)$ represents the power offset of PUCCHs in different formats relative to PUCCH format 1a;

Network side receives the uplink control information sent by the user equipment on PUCCH, wherein PUCCH transmit power is determined by the user equipment according to the $\Delta_{F\_PUCCH}(F)$ configured.

A network equipment, comprising:

Configuration module, used for configuring $\Delta_{F\_PUCCH}(F)$ parameter of PUCCH transmit power to user equipment, and the $\Delta_{F\_PUCCH}(F)$ represents the power offset of PUCCHs in different formats relative to PUCCH format 1a;

Receiving module, used for receiving the uplink control information sent by the user equipment on PUCCH, wherein PUCCH transmit power is determined by the user equipment according to the $\Delta_{F\_PUCCH}(F)$ configured.

Among the aforementioned embodiments of the present invention, user equipment can determine $\Delta_{F\_PUCCH}(F)$ and h(n) for calculating PUCCH transmit power according to whether the number of bits of the uplink control information is larger than a predefined threshold, and then calculate PUCCH transmit power, so as to guarantee user equipment sends data according to proper power, avoid power waste, improve power utilization of user equipment and increase the accuracy of power control, thus improving the transmission performance of uplink control information.

DETAILED DESCRIPTION OF THE EMBODIMENTS OF THE PRESENT INVENTION

As described in background technology, PUCCH format 3 has been defined as a multiplexing transmission scheme of ACK/NACK in LTE-A system. PUCCH format 3 adopts sing-RM and Dual-RM to cause differences on transmission performance of different number of effective bits, while for ACK/NACK feedback, $h(n_{CQI}, n_{HARQ}, n_{SR})$ function calculates the power based on the codebook corresponding to TB actually received by UE. It can thus be seen that, in the two cases that when the codebook is larger than 11 bits or smaller than or equal to 11 bits, different $h(n_{CQI}, n_{HARQ}, n_{SR})$ functions shall be adopted for power control, so as to increase the accuracy of power control. As the compensation of $h(n_{CQI}, n_{HARQ}, n_{SR})$ function for power control of different number of bits, $\Delta_{F\_PUCCH}(F)$ shall also be independently configured for the two situations with the codebook larger than 11 bits or not larger than 11 bits. Moreover, the transmission performance also varies when PUCCH adopts a single-antenna port mode or a multi-antenna port mode (refer to transmission diversity in LTE-A Rel-10, viz. SORTD scheme) to transmit ACK/NACK, which means that different $h(n_{CQI}, n_{HARQ}, n_{SR})$ functions are also required. Specific to the aforementioned problems, the embodiments of the present invention put forward a scheme of selecting PUCCH power control parameter based on ACK/NACK codebook.

The technical solutions in the present invention are explained in a detailed way with reference to the drawings in the present invention.

Figure 1:
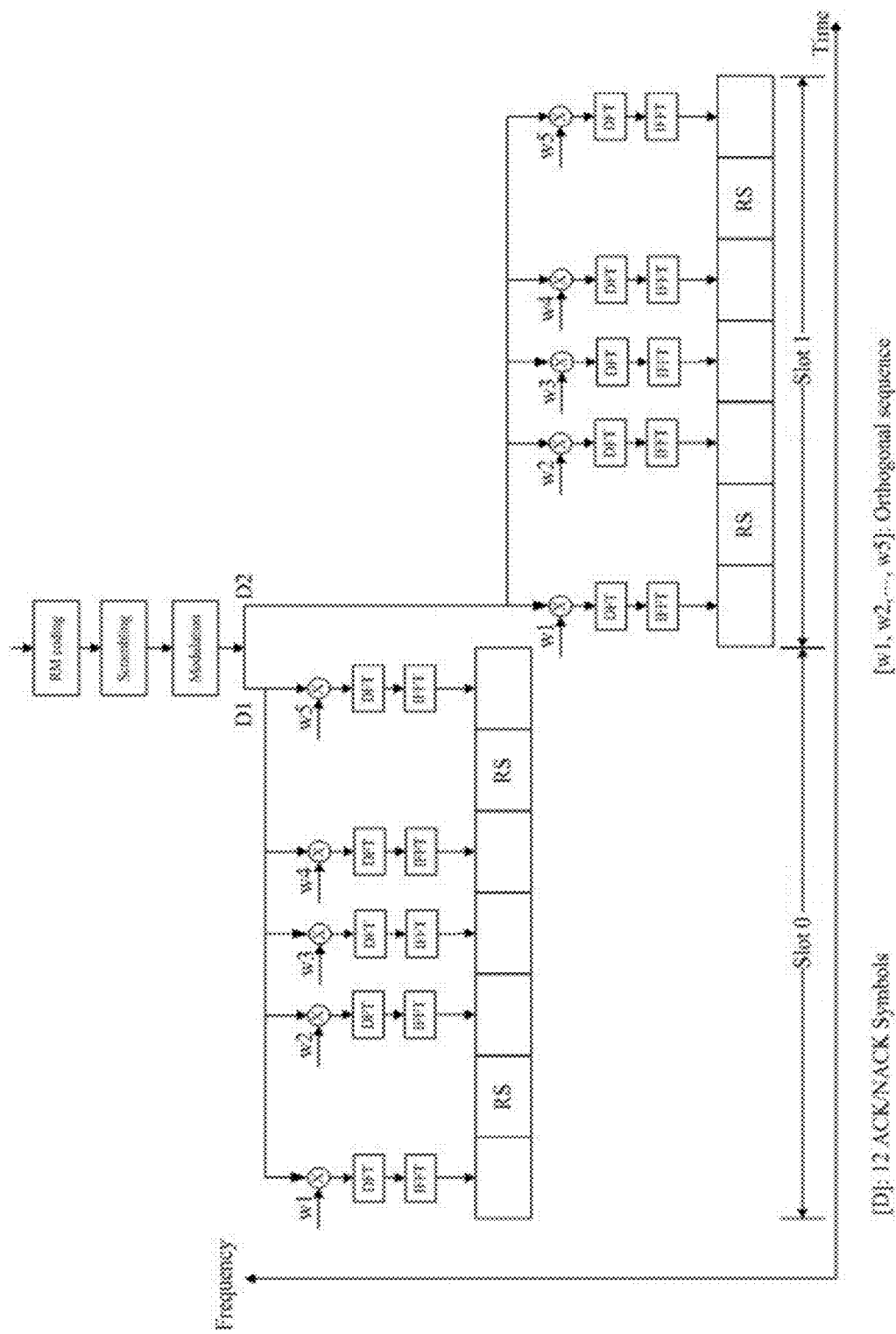
FIG. 1 is the structure diagram of PUCCH format 3 transmission with normal CP in current technology.
Figure 2:
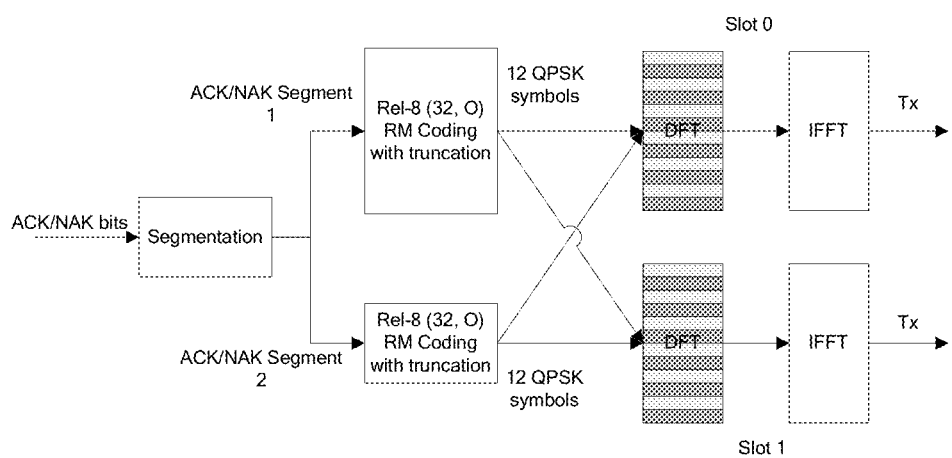
FIG. 2 is the structure diagram of Dual-RM encoding in current technology.
Figure 3:
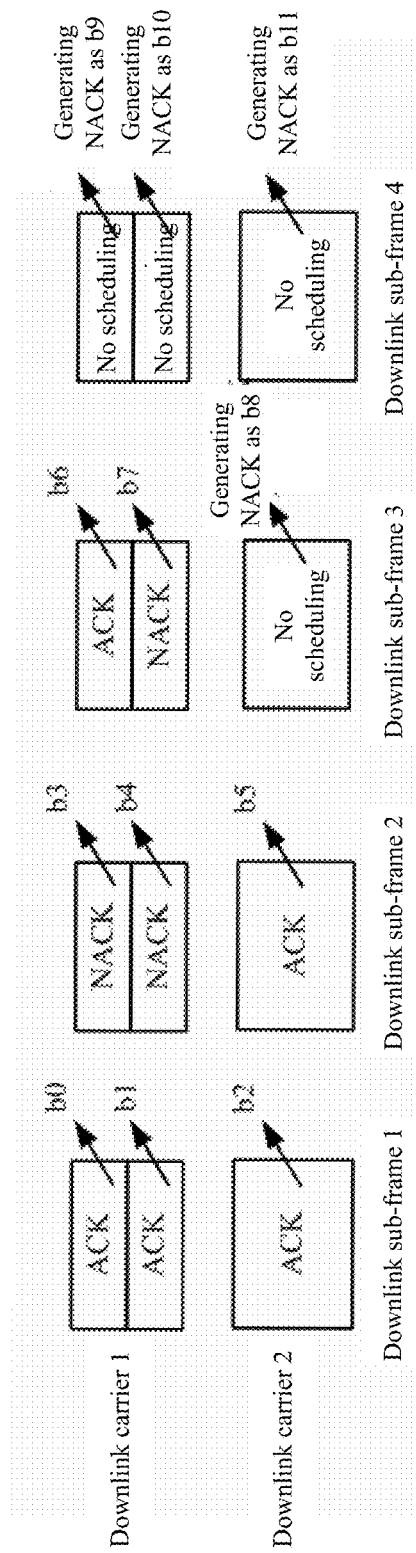
FIG. 3 is the diagram of scheduling in current technology.
Figure 4:
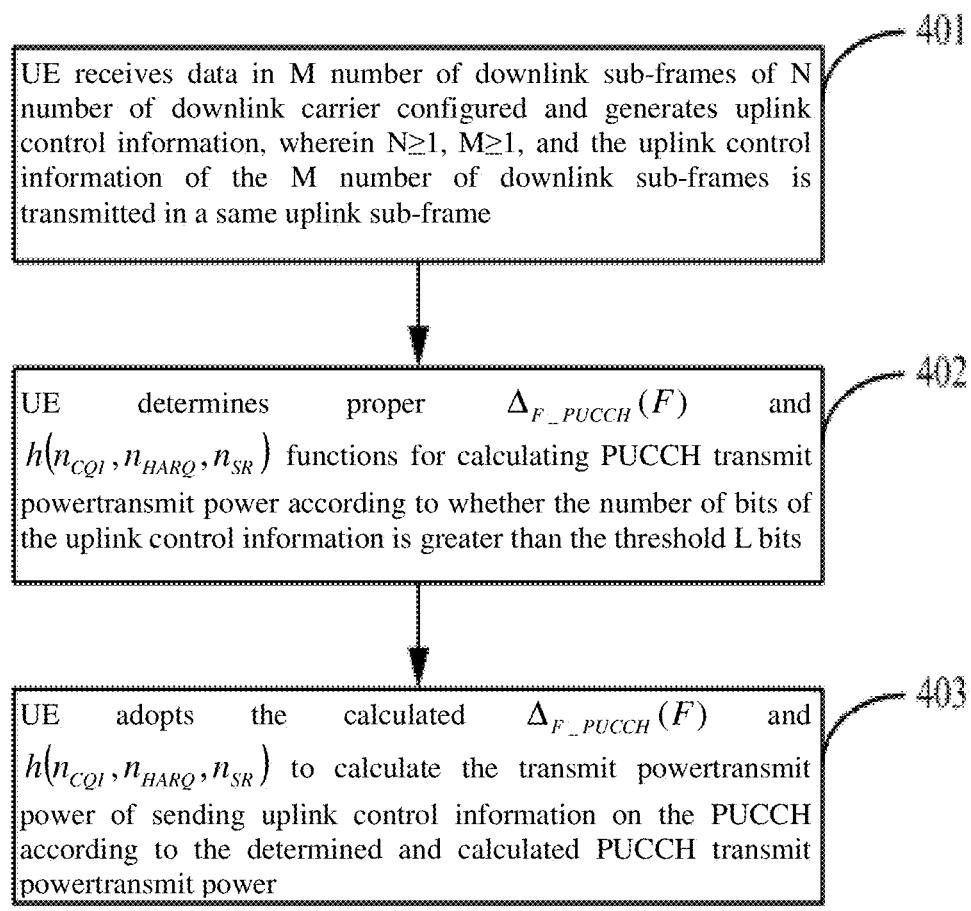
FIG. 4 is the flow diagram of uplink power control provided in the embodiments of the present invention.

As shown in FIG. 4, in LTE-A system, when at least one downlink carrier is configured for UE, the power control process of physical uplink control channel (such as PUCCH) may comprise the following if UE sends uplink control information in PUCCH:

Step 401, UE receives data in M downlink sub-frames of N downlink carriers and generates uplink control information, wherein N≥1, M≥1, and the uplink control information of the M downlink sub-frames is transmitted in one uplink sub-frame. Therein, uplink control information can include one or several kinds of ACK/NACK feedback information, CSI, SR information, etc. The CSI information also comprises one or several kinds of CQI, PMI, RI, PTI, etc., uplink control information can be bundled feedback information and bundling mode can be Spatial Bundling, Time-Domain Bundling, or others. When uplink control information is ACK/NACK, the number of bits can be determined in accordance with the number of downlink carrier configured, transmission mode of each downlink carrier configured and the number of downlink sub-frame requiring ACK/NACK feedback corresponding to one uplink sub-frame; the number of bits of uplink control information can also be the number of bits of bundled ACK/NACK feedback information after bundling.

Step 402, UE determines proper $\Delta_{F\_PUCCH}(F)$ and $h(n_{CQI}, n_{HARQ}, n_{SR})$ which are used to calculate the transmit power of a physical uplink control channel (PUCCH) according to whether the number of bits of the uplink control information is larger than the threshold L bits, the $\Delta_{F\_PUCCH}(F)$ represents the power offset of different PUCCH formats relative to the PUCCH format 1a, and the $h(n_{CQI}, n_{HARQ}, n_{SR})$ represents the power offset corresponding to the number of transmission bits of the PUCCH. For excellent ones, threshold L can be 11.

To be specific, UE can adopt the following methods to determine $\Delta_{F\_PUCCH}(F)$ and $h(n_{CQI}, n_{HARQ}, n_{SR})$ functions according to whether the number of bits of the uplink control information is larger than the threshold L bits:

(1) If the number of bits of uplink control information generated is not larger than L bits, RM(32,O)+repetition encoding method will be adopted, and UE will determine to adopt the $\Delta_{F\_PUCCH}(F)$ and $h(n_{CQI}, n_{HARQ}, n_{SR})$ functions corresponding to RM encoding method for calculating PUCCH transmit power. As for ACK/NACK transmission, optimized, there are $\Delta_{F\_PUCCH}(F) \in \{-1,0,1,2\}$ dB and $h(n_{CQI}, n_{HARQ}, n_{SR}) = 0.5 \cdot (n_{HARQ} + n_{SR}) - 1.3$.

(2) If the number of bits of uplink control information generated is larger than L bits, Dual-RM encoding method will be adopted, and UE will determine to adopt the $\Delta_{F\_PUCCH}(F)$ and $h(n_{CQI}, n_{HARQ}, n_{SR})$ functions corresponding to Dual-RM encoding method for calculating PUCCH transmit power. As for ACK/NACK transmission, optimized, there are $\Delta_{F\_PUCCH}(F) \in \{2,3,4,5\}$ dB or $\Delta_{F\_PUCCH}(F) \in \{3,4,5,6\}$ dB and $h(n_{CQI}, n_{HARQ}, n_{SR}) = 0.25 \cdot (n_{HARQ} + n_{SR}) - 0.75$.

It should be noted that, in case of combination with PUCCH transmission mode, under one PUCCH transmission mode, the corresponding $h(n_{CQI}, n_{HARQ}, n_{SR})$ functions may be identical or different when the number of bits of the uplink control information is not larger than and larger than L bits. For example, under single-antenna port transmission mode, the corresponding $h(n_{CQI}, n_{HARQ}, n_{SR})$ functions are different when the number of bits of the uplink control information is not larger than and larger than L bits, while under multi-antenna port transmission mode, the corresponding $h(n_{CQI}, n_{HARQ}, n_{SR})$ functions are identical when the number of bits of the uplink control information is not larger than and larger than L bits; the corresponding $\Delta_{F\_PUCCH}(F)$ values may be identical or different when the number of bits of the uplink control information is not larger than and larger than L bits.

Therein, $\Delta_{F\_PUCCH}(F)$ can be configured in the following methods:

Method (1): Higher layer signaling pre-configures two $\Delta_{F\_PUCCH}(F)$ values: $\Delta_{F\_PUCCH\_1}(F)$ and $\Delta_{F\_PUCCH\_2}(F)$ to respectively represent the $\Delta_{F\_PUCCH}(F)$ parameter value when the number of bits of the uplink control information is not larger than and larger than L bits; correspondingly, UE can select $\Delta_{F\_PUCCH\_1}(F)$ when the number of bits of the uplink control information is not larger than the threshold L bits and select $\Delta_{F\_PUCCH\_2}(F)$ when it is larger than threshold L bits. Therein, when uplink control information is ACK/NACK, optimized, there are $\Delta_{F\_PUCCH\_1}(F) \in \{-1,0,1,2\}$ dB, $\Delta_{F\_PUCCH\_2}(F) \in \{2,3,4,5\}$ dB or $\Delta_{F\_PUCCH\_2}(F) \in \{3,4,5,6\}$.

Method (2): First higher layer signaling pre-configures a $\Delta_{F\_PUCCH}(F)$ value, and the rest $\Delta_{F\_PUCCH}(F)$ values shall be obtained based on the pre-configured $\Delta_{F\_PUCCH}(F)$ value and one δ value, wherein δ refers to the predefined offset or the offset pre-configured by higher layer signaling; for example: higher layer signaling pre-configures a $\Delta_{F\_PUCCH\_1}(F)$ value to represent the corresponding $\Delta_{F\_PUCCH}(F)$ parameter value when the number of bits of uplink control information is not larger than L bits, and the corresponding $\Delta_{F\_PUCCH\_2}(F)$ when it is larger than L bits is obtained according to pre-configured or predefined offset δ based on $\Delta_{F\_PUCCH\_1}(F)$, viz $\Delta_{F\_PUCCH\_2}(F) = \Delta_{F\_PUCCH\_1}(F) + \delta$. Therein, when uplink control information is ACK/NACK, optimized, there is $\Delta_{F\_PUCCH\_1}(F) \in \{-1,0,1,2\}$ dB, and the value of δ can make $\Delta_{F\_PUCCH\_2}(F) \in \{2,3,4,5\}$ dB or $\Delta_{F\_PUCCH\_2}(F) \in \{3,4,5,6\}$. Optimized, δ=3 or 4. Correspondingly, UE can select $\Delta_{F\_PUCCH\_1}(F)$ when the number of bits of uplink control information is not larger than threshold L bits and adopts $\Delta_{F\_PUCCH\_2}(F) = \Delta_{F\_PUCCH\_1}(F) + \delta$ when it is larger than threshold L bits. Especially, δ can also be 0, that is, whether the number of bits of uplink control information is larger than threshold L bits, adopt the same $\Delta_{F\_PUCCH}(F)$ parameter value, then δ cannot be pre-configured or predefined, and base station can select a proper value from the set $\{-1,0,1,2,3,4,5,6\}$ of $\Delta_{F\_PUCCH}(F)$ and directly configure it to UE through higher layer signaling to be as the $\Delta_{F\_PUCCH}(F)$ parameter value corresponding to PUCCH format3.

Step 403: UE calculates the transmit power of a physical uplink control channel (such as PUCCH) according to the determined $\Delta_{F\_PUCCH}(F)$ and $h(n_{CQI}, n_{HARQ}, n_{SR})$, and adopts the calculated transmit power to send the uplink control information determined in step 401 on the PUCCH.

Therein, the PUCCH channel can be either the PUCCH format 1b channel which is used in PUCCH format 1b with channel selection transmission scheme; or the channel which is used in the transmission scheme based on the combination of DFT-S-OFDM (Discrete Fourier Transform-Spread-Orthogonal Frequency Division Multiplexing) and time-domain spreading, such as PUCCH format 3 channel.

In another embodiment of the present invention, the differences with the flow presented in FIG. 4 are: based on step 402, UE can further determine $\Delta_{F\_PUCCH}(F)$ and $h(n_{CQI}, n_{HARQ}, n_{SR})$ functions according to PUCCH transmission mode, viz. the specific processes of UE determining proper $\Delta_{F\_PUCCH}(F)$ and $h(n_{CQI}, n_{HARQ}, n_{SR})$ functions according to whether the number of bits of uplink control information is larger than the threshold L bits comprises:

(1) When the number of bits of uplink control information is not larger than L bits: When PUCCH transmits information by single-antenna port transmission mode, UE determines the $\Delta_{F\_PUCCH}(F)$ and $h(n_{CQI}, n_{HARQ}, n_{SR})$ functions corresponding to RM encoding method under single-antenna port transmission mode for calculating PUCCH transmit power. As for ACK/NACK transmission, optimized, there are $\Delta_{F\_PUCCH}(F)\in\{-1,0,1,2\}$ dB and $h(n_{CQI}, n_{HARQ}, n_{SR})=0.5\cdot(n_{HARQ}+n_{SR})-1.3$.

When PUCCH transmits information by multi-antenna port transmission mode (in LTE-A Rel-10 system, refer to transmitting diversity transmission mode, viz. 2 antenna port transmission), UE determines the $\Delta_{F\_PUCCH}(F)$ and $h(n_{CQI}, n_{HARQ}, n_{SR})$ functions corresponding to RM encoding method under multi-antenna port transmission mode for calculating PUCCH transmit power. As for ACK/NACK transmission, optimized, there are $\Delta_{F\_PUCCH}(F)\in\{-1,0,1,2\}$ dB or $\Delta_{F\_PUCCH}(F)\in\{-2,-1,0,1\}$ dB and $h(n_{CQI}, n_{HARQ}, n_{SR})=0.35 (n_{HARQ}+n_{SR})-0.6$.

(2) When the number of bits of uplink control information is larger than L bits: When PUCCH transmits information by single-antenna port transmission mode, UE determines the $\Delta_{F\_PUCCH}(F)$ and $h(n_{CQI}, n_{HARQ}, n_{SR})$ functions corresponding to Dual-RM encoding method under single-antenna port transmission mode for calculating PUCCH transmit power. As for ACK/NACK transmission, optimized, there are $\Delta_{F\_PUCCH}(F)\in\{3,4,5,6\}$ dB and $h(n_{CQI}, n_{HARQ}, n_{SR})=0.3\cdot(n_{HARQ}+n_{SR})-1.5$.

When PUCCH transmits information by multi-antenna port transmission mode (in LTE-A Rel-10 system, refer to transmitting diversity transmission mode, viz. 2 antenna port transmission), UE determines the $\Delta_{F\_PUCCH}(F)$ and $h(n_{CQI}, n_{HARQ}, n_{SR})$ functions corresponding to Dual-RM encoding method under multi-antenna port transmission mode for calculating PUCCH transmit power. As for ACK/NACK transmission, optimized, there are $\Delta_{F\_PUCCH}(F)\in\{2,3,4,5\}$ dB or $\Delta_{F\_PUCCH}(F)\in\{3,4,5,6\}$ dB and $h(n_{CQI}, n_{HARQ}, n_{SR})=0.25\cdot(n_{HARQ}+n_{SR})-0.75$.

For the two conditions of whether the number of bits of uplink control information is larger than L bits, PUCCH transmission mode can be distinguished independently, viz. only further distinguishing PUCCH transmission mode for the condition that the number of bits of uplink control information is not larger than L bits, or only further distinguishing PUCCH transmission mode for the condition that the number of bits of uplink control information is larger than L bits, or simultaneously further distinguishing PUCCH transmission modes for the conditions that the number of bits of uplink control information is both not larger than and larger than L bits. Therein, configuration mode of $\Delta_{F\_PUCCH}(F)$ can follow method (1) and method (2) in step 402 above, viz. only configuring $\Delta_{F\_PUCCH}(F)$ when the number of bits of uplink control information is not larger than and larger than L bits, adopting the same $\Delta_{F\_PUCCH}(F)$ value for the number of bits of the same uplink control information under multi-antenna and single-antenna port transmission modes; or the following methods are applicable:

When PUCCH transmission mode is further distinguished only for the condition when the number of bits of uplink control information is smaller than or equal to L rather than the condition when it is larger than L, viz. the same $\Delta_{F\_PUCCH}(F)$ value is applied in both single-antenna and multi-antenna port transmission modes when the number of bits of uplink control information is larger than L, the following $\Delta_{F\_PUCCH}(F)$ configuration methods can be adopted:

Method (3): Higher layer signaling pre-configures three $\Delta_{F\_PUCCH}(F)$ values to respectively represent the $\Delta_{F\_PUCCH}(F)$ parameter values corresponding to single-antenna port transmission mode and multi-antenna port transmission mode when the number of bits of uplink control information is smaller than or equal to L, as well as the corresponding $\Delta_{F\_PUCCH}(F)$ parameter value when it is larger than L, for example:

Higher layer signaling pre-configures three $\Delta_{F\_PUCCH}(F)$ values: $\Delta_{F\_PUCCH\_1\_1}(F)$, $\Delta_{F\_PUCCH\_1\_2}(F)$ and $\Delta_{F\_PUCCH\_2}(F)$, wherein:

$\Delta_{F\_PUCCH\_1\_1}(F)$ refers to the $\Delta_{F\_PUCCH}(F)$ parameter value corresponding to single-antenna port transmission mode when the number of bits of uplink control information is smaller than or equal to L; as for ACK/NACK transmission, optimized, there is $\Delta_{F\_PUCCH\_1\_1}(F)\in\{-1,0,1,2\}$ dB;

$\Delta_{F\_PUCCH\_1\_2}(F)$ represents the $\Delta_{F\_PUCCH}(F)$ parameter value corresponding to multi-antenna port transmission mode when the number of bits of uplink control information is smaller than or equal to L; as for ACK/NACK transmission, optimized, there is $\Delta_{F\_PUCCH\_1\_1}(F)\in\{-1,0,1,2\}$ dB or $\Delta_{F\_PUCCH\_1\_2}(F)\in\{-2,-1,0,1\}$ dB;

$\Delta_{F\_PUCCH\_2}(F)$ stands for the $\Delta_{F\_PUCCH}(F)$ corresponding parameter value when the number of bits of uplink control information is larger than L, viz. not distinguishing PUCCH transmission mode when the number of bits of uplink control information is larger than L, and adopting the same $\Delta_{F\_PUCCH}(F)$ value for single-antenna and multi-antenna port transmission modes; as for ACK/NACK transmission, optimized, there is $\Delta_{F\_PUCCH\_2}(F)\in\{3,4,5,6\}$ dB;

Correspondingly, UE can select proper $\Delta_{F\_PUCCH}(F)$ parameter value according to whether the number of bits of uplink control information is larger than the threshold L bits and the PUCCH transmission mode.

Besides, method (3) can also be evolved into the mode that higher layer signaling only configures part $\Delta_{F\_PUCCH}(F)$ (at least one) parameter value(s), with other parameter values obtained based on the predefined offset or the offset pre-configured by higher layer, viz.:

Higher layer signaling can pre-configure two $\Delta_{F\_PUCCH}(F)$ s to respectively represent two of the $\Delta_{F\_PUCCH}(F)$ parameter values corresponding to single-antenna port transmission mode and multi-antenna port transmission mode when the number of bits of uplink control information is smaller than or equal to L, and the corresponding $\Delta_{F\_PUCCH}(F)$ parameter values when it is larger than L, with the rest $\Delta_{F\_PUCCH}(F)$ parameter values obtained according to pre-configured or predefined offset based on the configured $\Delta_{F\_PUCCH}(F)$ parameter values, for example:

Method (3-1): Higher layer signaling pre-configures two $\Delta_{F\_PUCCH}(F)$ values: $\Delta_{F\_PUCCH\_1\_1}(F)$ and $\Delta_{F\_PUCCH\_2}(F)$, wherein:

$\Delta_{F\_PUCCH\_1\_1}(F)$ refers to the $\Delta_{F\_PUCCH}(F)$ parameter value corresponding to single-antenna port transmission mode when the number of bits of uplink control information is smaller than or equal to L; for ACK/NACK transmission, optimized, there is $\Delta_{F\_PUCCH\_1\_1}(F)\in\{-1,0,1,2\}$ dB;

$\Delta_{F\_PUCCH\_2}(F)$ represents the corresponding $\Delta_{F\_PUCCH}(F)$ parameter value when the number of bits of uplink control information is larger than L, viz. not distinguishing PUCCH transmission mode when the number of bits of uplink control information is larger than L, and adopting the same $\Delta_{F\_PUCCH}(F)$ value for single-antenna and multi-antenna port transmission modes; as for ACK/NACK transmission, optimized, there is $\Delta_{F\_PUCCH\_2}(F)\in\{3,4,5,6\}$ dB;

Therein, when UE determines $\Delta_{F\_PUCCH\_1\_2}(F)$; the $\Delta_{F\_PUCCH}(F)$ parameter value corresponding to multi-antenna port transmission mode when the number of bits of uplink control information is smaller than or equal to L, it can be obtained according to pre-configured or predefined offset $\delta_1$ based on $\Delta_{F\_PUCCH\_1\_1}(F)$ or $\Delta_{F\_PUCCH\_1\_2}(F)$; viz.:

$\Delta_{F\_PUCCH\_1\_2}(F)=\Delta_{F\_PUCCH\_1\_1}(F)+\delta_1$; or $\Delta_{F\_PUCCH\_1\_2}(F)=\Delta_{F\_PUCCH\_2}(F)+\delta_1$;

Therein, the value of $\delta_1$ can lead to $\Delta_{F\_PUCCH\_1\_2}(F)\in\{-1,0,1,2\}$ dB or $\Delta_{F\_PUCCH\_1\_2}(F)\in\{-2,-1,0,1\}$ dB, with specific value of 0 or −1; esp. when eNB and UE predefine to adopt the same $\Delta_{F\_PUCCH}(F)$ parameter value for both single-antenna and multi-antenna port transmission modes, there is $\delta_1=0$, viz. $\Delta_{F\_PUCCH\_1\_2}(F)=\Delta_{F\_PUCCH\_1\_1}(F)$, or, when eNB and UE predefine to adopt the same $\Delta_{F\_PUCCH}(F)$ parameter value when the number of bits of uplink control information is both smaller than or equal to L and larger than L, $\delta_1=0$, viz. $\Delta_{F\_PUCCH\_1\_2}(F)=\Delta_{F\_PUCCH\_1\_2}(F)$; $\delta_1$ cannot be pre-configured or pre-defined; Correspondingly, UE can select proper $\Delta_{F\_PUCCH}(F)$ parameter value according to whether the number of bits of uplink control information is larger than the threshold L bits and the PUCCH transmission mode.

Method (3-2): Higher layer signaling pre-configures two $\Delta_{F\_PUCCH}(F)$ values: $\Delta_{F\_PUCCH\_1\_1}(F)$ and $\Delta_{F\_PUCCH\_1\_2}(F)$, wherein:

$\Delta_{F\_PUCCH\_1\_1}(F)$ refers to the $\Delta_{F\_PUCCH}(F)$ parameter value corresponding to single-antenna port transmission mode when the number of bits of uplink control information is smaller than or equal to L; as for ACK/NACK transmission, optimized, there is $\Delta_{F\_PUCCH\_1\_1}(F)\in\{-1,0,1,2\}$ dB;

$\Delta_{F\_PUCCH\_1\_2}(F)$ represents the $\Delta_{F\_PUCCH}(F)$ parameter value corresponding to multi-antenna port transmission mode when the number of bits of uplink control information is smaller than or equal to L; as for ACK/NACK transmission, optimized, there is $\Delta_{F\_PUCCH\_1\_2}(F)\in\{-1,0,1,2\}$ dB or $\Delta_{F\_PUCCH\_1\_2}(F)\in\{-2,-1,0,1\}$ dB;

Therein, when UE determines $\Delta_{F\_PUCCH\_2}(F)$, the corresponding $\Delta_{F\_PUCCH}(F)$ parameter value when the number of bits of uplink control information is larger than L, it can be obtained according to pre-configured or predefined offset $\delta_1$ based on $\Delta_{F\_PUCCH\_1\_1}(F)$ or $\Delta_{F\_PUCCH\_1\_2}(F)$, viz.:

$\Delta_{F\_PUCCH\_2}(F)$ $\Delta_{F\_PUCCH\_1\_1}(F)+\delta_1$, or $\Delta_{F\_PUCCH\_2}(F)=\Delta_{F\_PUCCH\_1\_2}(F)+\delta_1$;

Therein, the value of $\delta_1$ can lead to $\Delta_{F\_PUCCH\_2}(F)\in\{3,4,5,6\}$ dB, with specific value of 3 or 4; esp. when eNB and UE predefine to adopt the same $\Delta_{F\_PUCCH}(F)$ parameter value for the conditions when the number of bits of uplink control information is both larger than L and smaller than or equal to L, there is $\delta_1=0$, viz. $\Delta_{F\_PUCCH\_1\_2}(F)=\Delta_{F\_PUCCH\_1\_1}(F)$, or $\Delta_{F\_PUCCH\_2}(F)=\Delta_{F\_PUCCH\_1\_2}(F)$, and $\delta_1$ cannot be pre-configured or predefined;

Correspondingly, UE can select proper $\Delta_{F\_PUCCH}(F)$ parameter value according to whether the number of bits of uplink control information is larger than the threshold L bits and the PUCCH transmission mode.

Moreover, higher layer signaling can also pre-configure one $\Delta_{F\_PUCCH}(F)$ to represent one of the $\Delta_{F\_PUCCH}(F)$ parameter values corresponding to single-antenna port transmission mode and multi-antenna port transmission mode when the number of bits of uplink control information is smaller than or equal to L, and the corresponding $\Delta_{F\_PUCCH}(F)$ parameter values when it is larger than L, with the rest $\Delta_{F\_PUCCH}(F)$ parameter values obtained according to pre-configured or predefined offset based on the configured $\Delta_{F\_PUCCH}(F)$ parameter values, for example:

Method (3-3): Higher layer signaling pre-configures one $\Delta_{F\_PUCCH}(F)$ value, $\Delta_{F\_PUCCH\_1\_1}(F)$, to represent the $\Delta_{F\_PUCCH}(F)$ parameter value corresponding to single-antenna port transmission mode when the number of uplink control information is smaller than or equal to L; as for ACK/NACK transmission, optimized, there is $\Delta_{F\_PUCCH\_1\_1}(F)\in\{-1,0,1,2\}$ dB;

Therein, When UE determines $\Delta_{F\_PUCCH\_1\_2}(F)$, the $\Delta_{F\_PUCCH}(F)$ parameter value corresponding to multi-antenna port transmission mode when the number of bits of uplink control information is smaller than or equal to L, and $\Delta_{F\_PUCCH\_2}(F)$, the corresponding $\Delta_{F\_PUCCH}(F)$ parameter value when it is larger than L, it can be obtained according to pre-configured or predefined offset $\delta_1$ and $\delta_2$ based on $\Delta_{F\_PUCCH\_1\_1}(F)$, viz.:

$\Delta_{F\_PUCCH\_1\_2}(F)=\Delta_{F\_PUCCH\_1\_1}(F)+\delta_1$;

$\Delta_{F\_PUCCH\_2}(F)=\Delta_{F\_PUCCH\_1\_1}(F)+\delta_2$;

Therein, $\delta_1$ and $\delta_2$ can be either identical or different. The value of $\delta_1$ can lead to $\Delta_{F\_PUCCH\_1\_2}(F)\in\{1,0,1,2\}$ dB or $\Delta_{F\_PUCCH\_1\_2}(F)\in\{-2,-1,0,1\}$ dB, with specific value of 0 or −1; esp. when eNB and UE predefine to adopt the same $\Delta_{F\_PUCCH}(F)$ parameter value for both single-antenna and multi-antenna port transmission modes, there is $\delta_1=0$, viz. $\Delta_{F\_PUCCH\_1\_2}(F)=\Delta_{F\_PUCCH\_1\_1}(F)$, and $\delta_1$ cannot be pre-configured or predefined; the value of $\delta_2$ can lead to $\Delta_{F\_PUCCH\_2}(F)\in\{3,4,5,6\}$, with specific value of 3 or 4; esp. when eNB and UE predefine to adopt the same $\Delta_{F\_PUCCH}(F)$ parameter value when the number of bits of uplink control information is both larger than L and smaller than or equal to L, there is $\delta_2=0$, viz. $\Delta_{F\_PUCCH\_2}(F)=\Delta_{F\_PUCCH\_1\_1}(F)$, and $\delta_2$ cannot be pre-configured or predefined; esp. when eNB and UE predefine to adopt the same $\Delta_{F\_PUCCH}(F)$ parameter value under both single-antenna and multi-antenna port transmission modes when the number of bits of uplink control information is both larger than L and smaller than or equal to L, there are $\delta_1=0$ and $\delta_2=0$, viz. $\Delta_{F\_PUCCH\_2}(F)=\Delta_{F\_PUCCH\_1\_2}(F)=\Delta_{F\_PUCCH\_1\_1}(F)$, $\delta_1$ and $\delta_2$ cannot be pre-configured and predefined. Base station can select a proper value from the set $\{-1,0,1,2,4,5,6\}$ of $\Delta_{F\_PUCCH}(F)$ and directly configure it to UE through higher layer signaling to be as the $\Delta_{F\_PUCCH}(F)$ parameter value corresponding to PUCCH format3.

Correspondingly, UE can select proper $\Delta_{F\_PUCCH}(F)$ parameter value according to whether the number of bits of uplink control information is larger than the threshold L bits and the PUCCH transmission mode.

When PUCCH transmission mode is further distinguished only for the condition when the number of bits of uplink control information is larger than L rather than the condition when it is smaller than or equal to L, viz. the same $\Delta_{F\_PUCCH}(F)$ value is applied in both single-antenna and multi-antenna port transmission modes, the following $\Delta_{F\_PUCCH}(F)$ configuration method can be adopted:

Method (4): Higher layer signaling pre-configures three $\Delta_{F\_PUCCH}(F)$ values to respectively represent the corresponding $\Delta_{F\_PUCCH}(F)$ parameter values when the number of bits of uplink control information is smaller than or equal to L, and the $\Delta_{F\_PUCCH}(F)$ parameter values corresponding to single-antenna port transmission mode and multi-antenna port transmission mode when it is larger than L, for example:

Higher layer signaling pre-configures three $\Delta_{F\_PUCCH}(F)$ values: $\Delta_{F\_PUCCH\_1}(F)$, $\Delta_{F\_PUCCH\_2\_1}(F)$ and $\Delta_{F\_PUCCH\_2\_2}(F)$, wherein: $\Delta_{F\_PUCCH\_1}(F)$ refers to the corresponding $\Delta_{F\_PUCCH}(F)$ parameter values when the number of bits of uplink control information is smaller than or equal to L, viz. not distinguishing PUCCH transmission mode when the number of bits of uplink control information is smaller than or equal to L, adopting the same $\Delta_{F\_PUCCH}(F)$ value for both single-antenna and multi-antenna port transmission modes; as for ACK/NACK transmission, optimized, there is $\Delta_{F\_PUCCH\_1}(F)\in\{-1,0,1,2\}$ dB; $\Delta_{F\_PUCCH\_2\_1}(F)$ represents the $\Delta_{F\_PUCCH}(F)$ parameter value corresponding to single-antenna port transmission mode when the number of bits of uplink control information is larger than L; as for ACK/NACK transmission, optimized, there is $\Delta_{F\_PUCCH\_2\_1}(F)$ $\epsilon\{3,4,5,6\}$ dB;

$\Delta_{F\_PUCCH\_2\_2}(F)$ represents the $\Delta_{F\_PUCCH}(F)$ parameter value corresponding to multi-antenna port transmission mode when the number of bits of uplink control information is larger than L; as for ACK/NACK transmission, optimized, there is $\Delta_{F\_PUCCH\_2\_2}(F)\epsilon\{2,3,4,5\}$ dB or $\Delta_{F\_PUCCH\_2\_2}(F)$ $\epsilon\{3,4,5,6\}$ dB;

Correspondingly, UE can select proper $\Delta_{F\_PUCCH}(F)$ parameter value according to whether the number of bits of uplink control information is larger than the threshold L bits and the PUCCH transmission mode.

Besides, method (4) can also be evolved into the mode that higher layer signaling only configures part $\Delta_{F\_PUCCH}(F)$ (at least one) parameter value(s), with other parameter values obtained based on the offset predefined or the offset pre-configured by higher layer, viz.:

Higher layer signaling can pre-configure two $\Delta_{F\_PUCCH}$ (F) s to respectively represent two of the corresponding $\Delta_{F\_PUCCH}(F)$ parameter values when the number of bits of uplink control information is smaller than or equal to L, and the $\Delta_{F\_PUCCH}(F)$ parameter values corresponding to single-antenna port transmission mode and multi-antenna port transmission mode when it is larger than L, with the $\Delta_{F\_PUCCH}(F)$ parameter values obtained according to pre-configured or predefined offset based on the configured $\Delta_{F\_PUCCH}(F)$ parameter values, for example:

Method (4-1): Higher layer signaling pre-configures two $\Delta_{F\_PUCCH}(F)$ values: $\Delta_{F\_PUCCH\_1}(F)$ and $\Delta_{F\_PUCCH\_2\_1}(F)$, wherein:

$\Delta_{F\_PUCCH\_1}(F)$ refers to the corresponding $\Delta_{F\_PUCCH}(F)$ parameter values when the number of bits of uplink control information is smaller than or equal to L, viz. not distinguishing PUCCH transmission mode when the number of bits of uplink control information is smaller than or equal to L, and adopting the same $\Delta_{F\_PUCCH}(F)$ value for both single-antenna and multi-antenna port transmission modes; as for ACK/NACK transmission, optimized, there is $\Delta_{F\_PUCCH\_1}(F)\epsilon\{-1,0,1,2\}$ dB;

$\Delta_{F\_PUCCH\_2\_1}(F)$ represents $\Delta_{F\_PUCCH}(F)$ parameter values corresponding to single-antenna port transmission mode and multi-antenna port transmission mode when the number of bits of uplink control information is larger than L; as for ACK/NACK transmission, optimized, there is $\Delta_{F\_PUCCH\_2\_1}(F)\epsilon\{3,4,5,6\}$ dB;

Therein, when UE determines $\Delta_{F\_PUCCH\_2\_2}(F)$, the $\Delta_{F\_PUCCH}(F)$ parameter value corresponding to multi-antenna port transmission mode when the number of bits of uplink control information is larger than L, it can be obtained according to pre-configured or predefined offset $\delta_1$ based on $\Delta_{F\_PUCCH\_1}(F)$ or $\Delta_{F\_PUCCH\_2\_1}(F)$, viz.:

$\Delta_{F\_PUCCH\_2\_2}(F)=\Delta_{F\_PUCCH\_1}(F)+\delta_1$; or $\Delta_{F\_PUCCH\_2\_2}(F)=\Delta_{F\_PUCCH\_2\_1}(F)+\delta_1$;

Therein, the value of $\delta_1$ can lead to $\Delta_{F\_PUCCH\_2\_2}(F)\epsilon\{2,3,4,5\}$ dB or $\Delta_{F\_PUCCH\_2\_2}(F)\epsilon\{3,4,5,6\}$ dB, with specific value of 3 or 4; esp. when eNB and UE predefine to adopt the same $\Delta_{F\_PUCCH}(F)$ parameter value when the number of bits of uplink control information is both larger than L and smaller than or equal to L, there is $\delta_1=0$, viz. $\Delta_{F\_PUCCH\_2\_2}(F)=\Delta_{F\_PUCCH\_1}(F)$, or when eNB and UE predefine to adopt the same $\Delta_{F\_PUCCH}(F)$ parameter value for both single-antenna and multi-antenna port transmission modes, there is $\delta_1=0$, viz. $\Delta_{F\_PUCCH\_2\_2}(F)=\Delta_{F\_PUCCH\_2\_1}(F)$, and $\delta_1$ cannot be pre-configured or predefined; Correspondingly, UE can select proper $\Delta_{F\_PUCCH}(F)$ parameter value according to whether the number of bits of uplink control information is larger than the threshold L bits and the PUCCH transmission mode.

Method (4-2): Higher layer signaling pre-configures two $\Delta_{F\_PUCCH}(F)$ values: $\Delta_{F\_PUCCH\_1}(F)$ and $\Delta_{F\_PUCCH\_2\_2}(F)$ wherein:

$\Delta_{F\_PUCCH\_1}(F)$ refers to the corresponding $\Delta_{F\_PUCCH}(F)$ parameter values when the number of bits of uplink control information is smaller than or equal to L, viz. not distinguishing PUCCH transmission mode when the number of bits of uplink control information is smaller than or equal to L, and adopting the same $\Delta_{F\_PUCCH}(F)$ value for both single-antenna and multi-antenna port transmission modes; as for ACK/NACK transmission, optimized, there is $\Delta_{F\_PUCCH\_1}(F)\epsilon\{-1,0,1,2\}$ dB;

$\Delta_{F\_PUCCH\_2\_2}(F)$ represents the $\Delta_{F\_PUCCH}(F)$ parameter values corresponding to multi-antenna port transmission mode when the number of bits of uplink control information is larger than L; as for ACK/NACK transmission, optimized, there is $\Delta_{F\_PUCCH\_2\_2}(F)\epsilon\{2,3,4,5\}$ dB or $\Delta_{F\_PUCCH\_2\_2}(F)$ $\epsilon\{3,4,5,6\}$ dB;

Therein, when UE determines $\Delta_{F\_PUCCH\_2\_1}(F)$, the $\Delta_{F\_PUCCH}(F)$ parameter value corresponding to single-antenna port transmission mode when the number of bits of uplink control information is larger than L, it can be obtained according to pre-configured or predefined offset $\delta_1$ based on $\Delta_{F\_PUCCH\_1}(F)$ or $\Delta_{F\_PUCCH\_2\_2}(F)$, viz.:

$\Delta_{F\_PUCCH\_2\_1}(F)=\Delta_{F\_PUCCH\_1}(F)+\delta_1$; or $\Delta_{F\_PUCCH\_2\_1}(F)=\Delta_{F\_PUCCH\_2\_2}(F)+\delta_1$;

Therein, the value of $\delta_1$ can lead to $\Delta_{F\_PUCCH\_2\_1}(F)\epsilon\{3,4,5,6\}$, with specific value of 3 or 4; esp. when eNB and UE predefine to adopt the same $\Delta_{F\_PUCCH}(F)$ parameter value when the number of bits of uplink control information is both larger than L and smaller than or equal to L, there is $\delta_1=0$, viz. $\Delta_{F\_PUCCH\_2\_2}(F)=\Delta_{F\_PUCCH\_1}(F)$, or, when eNB and UE predefine to adopt the same $\Delta_{F\_PUCCH}(F)$ parameter value for both single-antenna and multi-antenna port transmission modes, there is $\delta_1=0$, viz. $\Delta_{F\_PUCCH\_2\_1}(F)=\Delta_{F\_PUCCH\_2\_2}(F)$ and $\delta_1$ cannot be pre-configured or predefined;

Correspondingly, UE can select proper $\Delta_{F\_PUCCH}(F)$ parameter value according to whether the number of bits of uplink control information is larger than the threshold L bits and the PUCCH transmission mode.

Besides, higher layer signaling can also pre-configures one $\Delta_{F\_PUCCH}(F)$ to represent one of the corresponding $\Delta_{F\_PUCCH}(F)$ parameter values when the number of bits of uplink control information is smaller than or equal to L, and the $\Delta_{F\_PUCCH}(F)$ parameter values corresponding to single-antenna port transmission mode and multi-antenna port transmission mode when the number of bits of uplink control information is larger than L, with the rest $\Delta_{F\_PUCCH}(F)$ parameter values obtained according to pre-configured or predefined offset based on the configured $\Delta_{F\_PUCCH}(F)$ parameter values, for example:

Method (4-3): Higher layer signaling pre-configures one $\Delta_{F\_PUCCH}(F)$ value, $\Delta_{F\_PUCCH\_1}(F)$, to represent the corresponding $\Delta_{F\_PUCCH}(F)$ parameter values when the number of bits of uplink control information is smaller than or equal to L, viz. not distinguishing PUCCH transmission mode when the number of bits of uplink control information is smaller than or equal to L, and adopting the same $\Delta_{F\_PUCCH}(F)$ value for both single-antenna and multi-antenna port transmission modes; as for AC K/NACK transmission, optimized, there is $\Delta_{F\_PUCCH\_1}(F)\epsilon\{-1,0,1,2\}$ dB;

Therein, when UE determines $\Delta_{F\_PUCCH\_2\_1}(F)$, the $\Delta_{F\_PUCCH}(F)$ parameter value corresponding to single-antenna port transmission mode, and $\Delta_{F\_PUCCH\_2\_2}(F)$ corresponding to multi-antenna port transmission mode when the number of bits of uplink control information is larger than L, it can be obtained according to pre-configured or predefined offset $\delta_1$ and $\delta_2$ based on $\Delta_{F\_PUCCH\_1}(F)$, viz.:

$\Delta_{F\_PUCCH\_2\_1}(F)=\Delta_{F\_PUCCH\_1}(F)+\delta_1$;
$\Delta_{F\_PUCCH\_2\_2}(F)=\Delta_{F\_PUCCH\_1}(F)+\delta_2$;

Therein, $\delta_1$ and $\delta_2$ can be either identical or different. The value of $\delta_1$ can lead to $\Delta_{F\_PUCCH\_2\_1}(F)\in\{3,4,5,6\}$, with specific value of 3 or 4; the value of $\delta_2$ can lead to $\Delta_{F\_PUCCH\_2\_2}(F)\in\{2,3,4,5\}$ dB or $\Delta_{F\_PUCCH\_2\_2}(F)\in\{3,4,5,6\}$ dB, with specific value of 3 or 4; esp. when eNB and UE predefine to adopt the same $\Delta_{F\_PUCCH}(F)$ parameter value for both single-antenna and multi-antenna port transmission modes, or, when eNB and UE predefine to adopt the same $\Delta_{F\_PUCCH}(F)$ parameter values when the number of bits of uplink control information is both larger than L and smaller than or equal to L, there is $\delta_1=\delta_2$, viz. $\Delta_{F\_PUCCH\_2\_1}(F)=\Delta_{F\_PUCCH\_2\_2}(F)$ $\Delta_{F\_PUCCH\_1}(F)+\delta_1$, only one $\delta_1$ value shall be configured or predefined; esp. when eNB and UE predefine to adopt the same $\Delta_{F\_PUCCH}(F)$ parameter value for both single-antenna and multi-antenna port transmission modes when the number of bits of uplink control information is both smaller than or equal to L and larger than L, there are $\delta_1=0$ and $\delta_2=0$, viz. $\Delta_{F\_PUCCH\_2\_1}(F)=\Delta_{F\_PUCCH\_2\_2}(F)=\Delta_{F\_PUCCH\_1}(F)$, then $\delta_1$ and $\delta_2$ cannot be pre-configured or predefined. Base station can select a proper value from the set $\{-1,0,1,2,4,5,6\}$ of $\Delta_{F\_PUCCH}(F)$ and directly configure it to UE through higher layer signaling to be as the $\Delta_{F\_PUCCH}(F)$ parameter value corresponding to PUCCH format3.

Correspondingly, UE can select proper $\Delta_{F\_PUCCH}(F)$ parameter value according to whether the number of bits of uplink control information is larger than the threshold L bits and the PUCCH transmission mode.

When PUCCH transmission mode is distinguished when the number of bits of uplink control information is both smaller than or equal to L and larger than L, viz. adopting independent $\Delta_{F\_PUCCH}(F)$ values for single-antenna port transmission mode and multi-antenna port transmission mode when the number of bits of uplink control information is both smaller than or equal to L and larger than L, the following $\Delta_{F\_PUCCH}(F)$ configuration method can be applied:

Method (5): Higher layer signaling pre-configures four $\Delta_{F\_PUCCH}(F)$ values to respectively represent the $\Delta_{F\_PUCCH}(F)$ parameter values and $\Delta_{F\_PUCCH}(F)$ parameter values corresponding to single-antenna port transmission mode and multi-antenna port transmission mode when the number of bits of uplink control information is smaller than or equal to L, and when it is larger than L, for example: Higher layer signaling pre-configures four $\Delta_{F\_PUCCH}(F)$ values: $\Delta_{F\_PUCCH\_1\_1}(F)$, $\Delta_{F\_PUCCH\_1\_2}(F)$, $\Delta_{F\_PUCCH\_2\_1}(F)$ and $\Delta_{F\_PUCCH\_2\_2}(F)$, wherein:

$\Delta_{F\_PUCCH\_1\_1}(F)$ refers to the $\Delta_{F\_PUCCH}(F)$ parameter values corresponding to single-antenna port transmission mode when the number of bits of uplink control information is smaller than or equal to L; as for ACK/NACK transmission, optimized, there is $\Delta_{F\_PUCCH}(F)\in\{-1,0,1,2\}$ dB;

$\Delta_{F\_PUCCH\_1\_2}(F)$ represents $\Delta_{F\_PUCCH}(F)$ parameter values corresponding to multi-antenna port transmission mode when the number of bits of uplink control information is smaller than or equal to L; as for ACK/NACK transmission, optimized, there is $\Delta_{F\_PUCCH\_1\_2}(F)\in\{1,0,1,2\}$ dB or $\Delta_{F\_PUCCH\_1\_2}(F)\in\{-2,-1,0,1\}$ dB;

$\Delta_{F\_PUCCH\_2\_1}(F)$ refers to the $\Delta_{F\_PUCCH}(F)$ parameter value corresponding to single-antenna port transmission mode when the number of bits of uplink control information is larger than L; as for ACK/NACK transmission, optimized, there is $\Delta_{F\_PUCCH\_2\_1}(F)\in\{3,4,5,6\}$ dB;

$\Delta_{F\_PUCCH\_2\_2}(F)$ represents the $\Delta_{F\_PUCCH}(F)$ parameter value corresponding to multi-antenna port transmission mode when the number of bits of uplink control information is larger than L; as for ACK/NACK transmission, optimized, there is $\Delta_{F\_PUCCH\_2\_2}(F)\in\{2,3,4,5\}$ dB or $\Delta_{F\_PUCCH\_2\_2}(F)\in\{3,4,5,6\}$ dB;

Correspondingly, UE can select proper $\Delta_{F\_PUCCH}(F)$ parameter value according to whether the number of bits of uplink control information is larger than the threshold L bits and the PUCCH transmission mode.

Besides, method (5) can also be evolved into the mode that higher layer signaling only configures part $\Delta_{F\_PUCCH}(F)$ (at least one) parameter value(s), with other parameter values obtained based on the predefined offset or the offset pre-configured by higher layer, viz.:

Higher layer signaling can pre-configure two $\Delta_{F\_PUCCH}(F)$ s to respectively represent two of the $\Delta_{F\_PUCCH}(F)$ parameter values and the $\Delta_{F\_PUCCH}(F)$ parameter values corresponding to single-antenna port transmission mode and multi-antenna port transmission mode when the number of bits of uplink control information is smaller than or equal to L, and when it is larger than L, with other $\Delta_{F\_PUCCH}(F)$ parameter values obtained according to pre-configured or predefined offset based on the configured $\Delta_{F\_PUCCH}(F)$ parameter value, for example:

Method (5-1): Higher layer signaling pre-configures two $\Delta_{F\_PUCCH}(F)$ values: $\Delta_{F\_PUCCH}(F)$ and $\Delta_{F\_PUCCH\_2\_1}(F)$, wherein: $\Delta_{F\_PUCCH\_1\_1}(F)$ refers to the $\Delta_{F\_PUCCH}(F)$ parameter values corresponding to single-antenna port transmission mode when the number of bits of uplink control information is smaller than or equal to L; as for ACK/NACK transmission, optimized, there is $\Delta_{F\_PUCCH\_1\_1}(F)\in\{-1,0,1,2\}$ dB;

$\Delta_{F\_PUCCH\_2\_1}(F)$ represents $\Delta_{F\_PUCCH}(F)$ parameter value corresponding to single-antenna port transmission mode when the number of bits of uplink control information is larger than L; as for ACK/NACK transmission, optimized, there is $\Delta_{F\_PUCCH\_2\_1}(F)\in\{3,4,5,6\}$ dB;

Therein, when UE determines $\Delta_{F\_PUCCH\_1\_2}(F)$, the $\Delta_{F\_PUCCH}(F)$ parameter value corresponding to multi-antenna port transmission mode when the number of bits of uplink control information is smaller than or equal to L, and $\Delta_{F\_PUCCH\_2\_2}(F)$, the $\Delta_{F\_PUCCH}(F)$ parameter value corresponding to multi-antenna port transmission mode when it is larger than L, it can be obtained according to pre-configured or predefined offset $\delta_1$ and $\delta_2$ based on $\Delta_{F\_PUCCH\_1\_1}(F)$ and $\Delta_{F\_PUCCH\_2\_1}(F)$, viz.:

$\Delta_{F\_PUCCH\_1\_2}(F)=\Delta_{F\_PUCCH\_1\_1}(F)+\delta_1$,
$\Delta_{F\_PUCCH\_2\_2}(F)=\Delta_{F\_PUCCH\_2\_1}(F)+\delta_2$;

Therein, $\delta_1$ and $\delta_2$ can be either identical or different. The value of $\delta_1$ can lead to $\Delta_{F\_PUCCH\_1\_2}(F)\in\{-1,0,1,2\}$ dB or $\Delta_{F\_PUCCH\_1\_2}(F)\in\{-2,-1,0,1\}$ dB, and that of $\delta_2$ can lead to $\Delta_{F\_PUCCH\_2\_2}(F)$ E $\{2,3,4,5\}$ dB or $\Delta_{F\_PUCCH\_2\_2}(F)$ E $\{3,4,5,6\}$, with specific value of 0 or −1; esp. when eNB and UE predefine to adopt the same $\Delta_{F\_PUCCH}(F)$ parameter value for both single-antenna and multi-antenna port transmission modes, that is, $\delta_1$ and/or $\delta_2$ is 0, $\delta_1$ and/or $\delta_2$ cannot be pre-configured or predefined, viz. $\Delta_{F\_PUCCH\_1\_2}(F)=\Delta_{F\_PUCCH\_1\_1}(F)$ and $\Delta_{F\_PUCCH\_2\_2}(F)=\Delta_{F\_PUCCH\_2\_1}(F)$;

Correspondingly, UE can select proper $\Delta_{F\_PUCCH}(F)$ parameter value according to whether the number of bits of uplink control information is larger than the threshold L bits and the PUCCH transmission mode.

Method (5-2): Higher layer signaling pre-configures two $\Delta_{F\_PUCCH}(F)$ values: $\Delta_{F\_PUCCH\_1\_1}(F)$ and $\Delta_{F\_PUCCH\_1\_2}(F)$, wherein:

$\Delta_{F\_PUCCH\_1\_1}(F)$ refers to $\Delta_{F\_PUCCH}(F)$ parameter values corresponding to single-antenna port transmission mode when the number of bits of uplink control information is smaller than or equal to L; as for ACK/NACK transmission, optimized, there is $\Delta_{F\_PUCCH\_1\_1}(F) \in \{-1,0,1,2\}$ dB; $\Delta_{F\_PUCCH\_1\_2}(F)$ represents the $\Delta_{F\_PUCCH}(F)$ parameter values corresponding to multi-antenna port transmission mode when the number of bits of uplink control information is smaller than or equal to L; as for ACK/NACK transmission, optimized, there is $\Delta_{F\_PUCCH\_1\_2}(F) \in \{-1,1,0,1,2\}$ dB or $\Delta_{F\_PUCCH\_1\_2}(F) \in \{-2,-1,0,1\}$ dB;

Therein, when UE determines $\Delta_{F\_PUCCH\_2\_1}(F)$, the $\Delta_{F\_PUCCH}(F)$ parameter value corresponding to single-antenna port transmission mode when the number of bits of uplink control information is larger than L, and $\Delta_{F\_PUCCH\_2\_2}(F)$, the $\Delta_{F\_PUCCH}(F)$ parameter value corresponding to multi-antenna port transmission mode when the number of bits of uplink control information is larger than L, it can be obtained according to pre-configured or predefined offset $\delta_1$ and $\delta_2$ based on $\Delta_{F\_PUCCH\_1}(F)$ and $\Delta_{F\_PUCCH\_3}(F)$, viz.:

$\Delta_{F\_PUCCH\_2\_1}(F) = \Delta_{F\_PUCCH\_1\_1}(F) + \delta_1$, $\Delta_{F\_PUCCH\_2\_2}(F) = \Delta_{F\_PUCCH\_1\_1}(F) + \delta_2$ or $\Delta_{F\_PUCCH\_2\_2}(F) = \Delta_{F\_PUCCH\_1\_2}(F) + \delta_3$;

Therein, $\delta_1$, $\delta_2$ and $\delta_3$ can be either identical or different. The value of $\delta_1$ can lead to $\Delta_{F\_PUCCH\_2\_1}(F) \in \{3,4,5,6\}$ dB, and those of $\delta_2$ and $\delta_3$ can lead to $\Delta_{F\_PUCCH\_2\_2}(F) \in \{2,3,4,5\}$ dB or $\Delta_{F\_PUCCH\_2\_2}(F) \in \{3,4,5,6\}$, with their specific value of 3 or 4; esp. when eNB and UE predefine to adopt the same $\Delta_{F\_PUCCH}(F)$ parameter value for both single-antenna and multi-antenna port transmission modes, only the value of $\delta_1$ shall be configured with $\delta_2$ and $\delta_3$ not pre-configured, viz. $\Delta_{F\_PUCCH\_2\_2}(F) = \Delta_{F\_PUCCH\_2\_1}(F) = \Delta_{F\_PUCCH\_1\_1}(F) + \delta_1$;

Correspondingly, UE can select proper $\Delta_{F\_PUCCH}(F)$ parameter value according to whether the number of bits of uplink control information is larger than the threshold L bits and the PUCCH transmission mode.

Moreover, higher layer signaling can also pre-configures one $\Delta_{F\_PUCCH}(F)$ to represent one of the $\Delta_{F\_PUCCH}(F)$ parameter values corresponding to single-antenna port transmission mode and multi-antenna port transmission mode when the number of bits of uplink control information is smaller than or equal to L, and the $\Delta_{F\_PUCCH}(F)$ parameter values corresponding to single-antenna port transmission mode and multi-antenna port transmission mode when it is larger than L, with the rest $\Delta_{F\_PUCCH}(F)$ parameters obtained according to pre-configured or predefined offset based on the configured $\Delta_{F\_PUCCH}(F)$ parameter value, for example:

Method (5-3): Higher layer signaling pre-configures one $\Delta_{F\_PUCCH}(F)$ value, $\Delta_{F\_PUCCH\_1\_1}(F)$, to represent the $\Delta_{F\_PUCCH}(F)$ parameter value corresponding to single-antenna port transmission mode when the number of bits of uplink control information is smaller than or equal to L; as for ACK/NACK transmission, optimized, there is $\Delta_{F\_PUCCH\_1\_1}(F) \in \{-0,1,2\}$ dB;

Therein, $\Delta_{F\_PUCCH\_1\_2}(F)$, corresponding to multi-antenna port transmission mode when the number of bits of uplink control information is smaller than or equal to L, as well as $\Delta_{F\_PUCCH\_2\_1}(F)$ and $\Delta_{F\_PUCCH\_2\_2}(F)$, respectively corresponding to single-antenna port transmission mode and multi-antenna port transmission mode when the number of bits of uplink control information is larger than L, can be obtained according to pre-configured or predefined offset $\delta_1$, $\delta_2$ and $\delta_3$ based on $\Delta_{F\_PUCCH\_1}(F)$, viz.:

$\Delta_{F\_PUCCH\_1\_2}(F) = \Delta_{F\_PUCCH\_1\_1}(F) + \delta_1$, $\Delta_{F\_PUCCH\_2\_1}(F) = \Delta_{F\_PUCCH\_1\_1}(F) + \delta_2$, $\Delta_{F\_PUCCH\_2\_2}(F) = \Delta_{F\_PUCCH\_1\_1}(F) + \delta_3$;

Therein, $\delta_1$, $\delta_2$ and $\delta_3$ can be either identical or different. The value of $\delta_1$ can lead to $\Delta_{F\_PUCCH\_1\_2}(F) \in \{-1,0,1,2\}$ dB or $\Delta_{F\_PUCCH\_1\_2}(F) \in \{-2,-1,0,1\}$ dB, that of $\delta_2$ can lead to $\Delta_{F\_PUCCH\_2\_1}(F) \in \{3,4,5,6\}$ dB and that of $\delta_3$ can lead to $\Delta_{F\_PUCCH\_2\_2}(F) \in \{2,3,4,5\}$ dB or $\Delta_{F\_PUCCH\_2\_2}(F) \in \{3,4,5,6\}$, with specific value of 0 or −1 for $\delta_1$ and 3 or 4 for $\delta_2$ and $\delta_3$; esp. when eNB and UE predefine to adopt the same $\Delta_{F\_PUCCH}(F)$ parameter value for both single-antenna and multi-antenna port transmission modes, there is $\delta_1 = \delta_3 = 0$, viz. $\Delta_{F\_PUCCH\_1\_2}(F) = \Delta_{F\_PUCCH\_1\_1}(F)$ and $\Delta_{F\_PUCCH\_2\_2}(F) = \Delta_{F\_PUCCH\_2\_1}(F) = \Delta_{F\_PUCCH\_1\_1}(F) + \delta_2$, and only the value of $\delta_2$ shall be pre-configured with those of $\delta_1$ and $\delta_3$ not pre-configured; esp. when eNB and UE predefine to adopt the same $\Delta_{F\_PUCCH}(F)$ parameter value when the number of bits of uplink control information is both larger than L and smaller than or equal to L, there is $\delta_1 = 0$, viz. $\Delta_{F\_PUCCH\_1\_2}(F) = \Delta_{F\_PUCCH\_1\_1}(F)$, and only the values of $\delta_1$ and $\delta_3$ shall be pre-configured with that of $\delta_1$ not pre-configured; esp. when eNB and UE predefine to adopt the same $\Delta_{F\_PUCCH}(F)$ parameter value when the number of bits of uplink control information is both larger than L and small than or equal to L, and also the same $\Delta_{F\_PUCCH}(F)$ parameter value for both single-antenna and multi-antenna port transmission modes, there is $\delta_1 = \delta_2 = \delta_3 = 0$, viz. $\Delta_{F\_PUCCH\_2\_1}(F) = \Delta_{F\_PUCCH\_2\_2}(F) = \Delta_{F\_PUCCH\_1\_2}(F) = \Delta_{F\_PUCCH\_1\_1}(F)$, and the values of $\delta_1$, $\delta_2$ and $\delta_3$ cannot be pre-configured. Base station can select a proper value from the set $\{-1,0,1,2,3,4,5,6\}$ of $\Delta_{F\_PUCCH}(F)$ and directly configure it to UE through higher layer signaling to be as the $\Delta_{F\_PUCCH}(F)$ parameter value corresponding to PUCCH format3.

Correspondingly, UE can select proper $\Delta_{F\_PUCCH}(F)$ parameter value according to whether the number of bits of uplink control information is larger than the threshold L bits and the PUCCH transmission mode.

In the aforementioned $h(n_{CQI}, n_{HARQ}, n_{SR})$ function, $n_{HARQ}$ is the ACK/NACK bit number used for calculating power offset of PUCCH bearing bit number, and $n_{SR}$ refers to the SR bit number used for calculating power offset of PUCCH bearing bit number. If SR transmission exists in current uplink sub-frame, there is $n_{SR} = 1$; if does not exist, there is $n_{SR} = 0$.

It should be noted that, $h(n_{CQI}, n_{HARQ}, n_{SR})$ function formula is given by taking ACK/NACK transmission as an example, not excluding the transmission of other information.

It should be noted that, the antenna port mentioned above refers to the antenna port corresponding to PUCCH.

Next, the embodiments of the present invention are explained in a detailed way with reference to specific application scenes.

Figure 5:
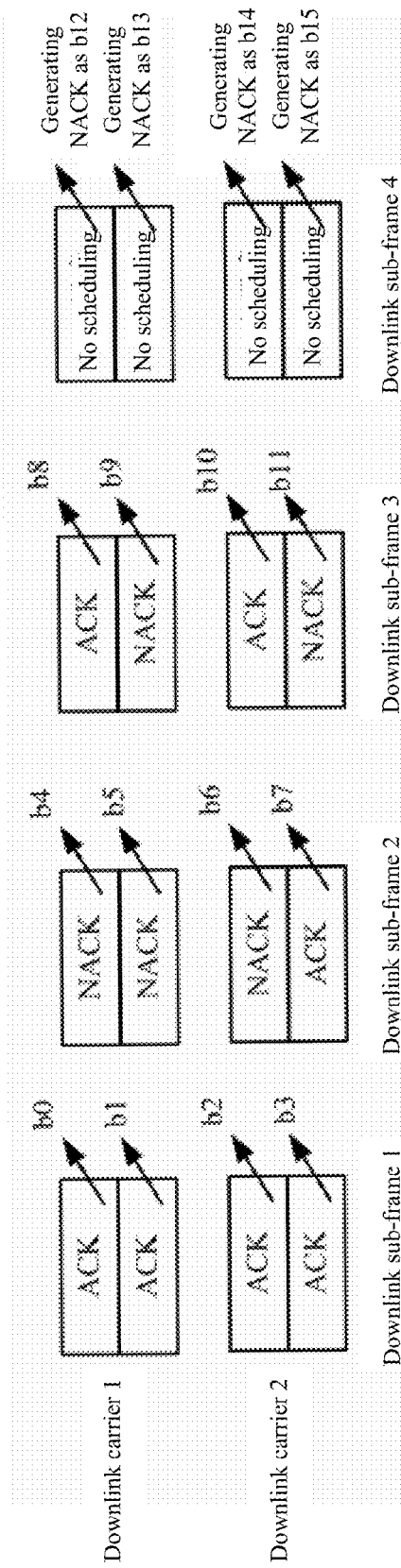
FIG. 5 is the flow diagram of uplink power control under Scene I in the embodiments of the present invention.

Scene I: When two downlink carriers are configured for UE and dual-codeword transmission mode is adopted, M=4, viz. UE needs to feed back the ACK/NACK feedback information of four downlink sub-frames in the current uplink sub-frame. If according to UE configuration, UE needs to feed back 16 bits ACK/NACK information, viz.

larger than 11 bits. As shown in FIG. 5, PUCCH format 3 is adopted to transmit ACK/NACK, with the specific power control process as below:

Base station end, operations concerning uplink power control mainly involve configuring $\Delta_{F\_PUCCH}(F)$ and receiving the data sent by UE in PUCCH channel according to the PUCCH transmit power estimated. Therein, the specific operations of configuring $\Delta_{F\_PUCCH}(F)$ include:

Adopting method (1) to configure: According to UE configuration, select one value from the corresponding set $\{-1,0,1,2\}$ of $\Delta_{F\_PUCCH}(F)$ when the number of bits of uplink control information is smaller than or equal to 11 bits, and the corresponding set $\{3,4,5,6\}$ of $\Delta_{F\_PUCCH}(F)$ when it is larger than 11 bits respectively, such as $\Delta_{F\_PUCCH\_1}(F)=-1$ and $\Delta_{F\_PUCCH\_2}(F)=3$, then pre-configure to UE through higher layer signaling;

Adopting method (2) to configure: According to UE configuration, select one value from the corresponding set $\{-1,0,1,2\}$ of $\Delta_{F\_PUCCH}(F)$ when the number of bits of uplink control information is smaller than or equal to 11 bits, such as $\Delta_{F\_PUCCH\_1}(F)=-1$, and then pre-configure it to UE through higher layer signaling; besides, base station and UE predefine $\delta=4$;

Adopting method (3) to configure: Only distinguish PUCCH transmission mode when the number of bits of uplink control information is smaller than or equal to 11 bits. According to UR configuration, respectively select one value from the set $\{-1,0,1,2\}$ of $\Delta_{F\_PUCCH}(F)$ corresponding to single-antenna port transmission mode when the number of bits of uplink control information is smaller than or equal to 11 bits, such as $\Delta_{F\_PUCCH\_1\_1}(F)=-1$, select one value from the set $\{-2,-1,0,1\}$ of $\Delta_{F\_PUCCH}(F)$ corresponding to multi-antenna port transmission mode when it is smaller than or equal to 11 bits, such as $\Delta_{F\_PUCCH\_1\_2}(F)=-2$, and select one value from the corresponding set $\{3,4,5,6\}$ of $\Delta_{F\_PUCCH}(F)$ when it is larger than 11 bits, such as $\Delta_{F\_PUCCH\_2}(F)=3$, then pre-configure to UE through higher layer signaling;

Further adopting the evolution method of method (3), such as method (3-3): According to UE configuration, select a value from the set $\{-1,0,1,2\}$ of $\Delta_{F\_PUCCH}(F)$ corresponding to single-antenna port transmission mode when the number of bits of uplink control information is smaller than or equal to 11 bits, such as $\Delta_{F\_PUCCH\_1\_1}(F)=-1$, and then pre-configure it to UE through higher layer signaling; besides base station and UE can predefine $\delta_1=-1$ and $\delta_2=4$;

Adopting method (4) to configure: Only distinguish PUCCH transmission mode when the number of bits of uplink control information is larger than 11 bits. According to UE configuration, respectively select one value from the set $\{-1,0,1,2\}$ of $\Delta_{F\_PUCCH}(F)$ when the number of bits of uplink control information is smaller than or equal to 11 bits, such as $\Delta_{F\_PUCCH\_1}(F)=-1$, select one value from the set $\{3,4,5,6\}$ of $\Delta_{F\_PUCCH}(F)$ corresponding to single-antenna port transmission mode when the number of bits of uplink control information is larger than 11 bits, such as $\Delta_{F\_PUCCH\_2\_1}(F)=3$, and select one value from the set $\{2,3,4,5\}$ of $\Delta_{F\_PUCCH}(F)$ corresponding to multi-antenna port transmission mode when the number of bits of uplink control information is larger than 11 bits, such as $\Delta_{F\_PUCCH\_2\_2}(F)=2$, and then pre-configure to UE through higher layer signaling; Further adopting the evolution method of method (4), such as method (4-3): According to UE configuration, select one value from the corresponding set $\{-1,0,1,2\}$ of $\Delta_{F\_PUCCH}(F)$ when the number of bits of uplink control information is smaller than or equal to 11 bits, such as $\Delta_{F\_PUCCH\_1}(F)=-1$, and then pre-configure it to UE through higher layer signaling; besides, base station and UE predefine $\delta_1=4$ and $\delta_2=3$;

Adopting method (5) to configure: Simultaneously distinguish PUCCH transmission mode when the number of bits of uplink control information is both smaller than or equal to 11 bits and larger than 11 bits. According to UE configuration, respectively select one value from the set $\{-1,0,1,2\}$ of $\Delta_{F\_PUCCH}(F)$ corresponding to single-antenna port transmission mode when the number of bits of uplink control information is smaller than or equal to 11 bits, such as $\Delta_{F\_PUCCH\_1\_1}(F)=-1$, select one value from the set $\{-2,-1,0,1\}$ of $\Delta_{F\_PUCCH}(F)$ corresponding to multi-antenna port transmission mode when it is smaller than or equal to 11 bits, such as $\Delta_{F\_PUCCH\_1\_2}(F)=-2$, select one value from the set $\{3,4,5,6\}$ of $\Delta_{F\_PUCCH}(F)$ corresponding to single-antenna port transmission mode when the number of bits of uplink control information is larger than 11 bits, such as $\Delta_{F\_PUCCH\_2\_1}(F)=3$, and select one value from the set $\{2,3,4,5\}$ of $\Delta_{F\_PUCCH}(F)$ corresponding to multi-antenna port transmission mode when it is larger than 11 bits, such as $\Delta_{F\_PUCCH\_2\_2}(F)=2$, then pre-configure to UE through higher layer signaling;

Further adopting the evolution method of method (5), such as method (5-3): According to UE configuration, select one value from the set $\{-1,0,1,2\}$ of $\Delta_{F\_PUCCH}(F)$ corresponding to single-antenna port transmission mode when the number of bits of uplink control information is smaller than or equal to 11 bits, such as $\Delta_{F\_PUCCH\_1\_1}(F)=-1$, and then configure it to UE through higher layer signaling; besides, base station and UE predefine $\delta_1=-1$, $\delta_2=4$ and $\delta_3=3$.

UE end: perform uplink power control, specifically process as follows for different cases:

Case I: Whether PUCCH adopts single-antenna port transmission mode or multi-antenna port transmission mode, UE selects the corresponding $\Delta_{F\_PUCCH}(F)$ and $h(n_{CQI}, n_{HARQ}, n_{SR})$ function when the number of bits of uplink control information is larger than 11 bits, to calculate PUCCH transmit power, viz.:

UE adopts $h(n_{CQI}, n_{HARQ}, n_{SR})=0.25 \cdot (n_{HARQ}+n_{SR})-0.75=0.25(12+0)-0.75=2.25$ to calculate the power offset corresponding to PUCCH bearing bit;

When $\Delta_{F\_PUCCH}(F)$ is configured according to method (1) mentioned above: UE shall adopt $\Delta_{F\_PUCCH\_2}(F)=3$ configured by higher layer, to further calculate PUCCH transmit power;

When $\Delta_{F\_PUCCH}(F)$ is configured according to method (2) mentioned above: UE shall obtain $\Delta_{F\_PUCCH\_2}(F)=\Delta_{F\_PUCCH\_1}(F)+\delta=-1+4=3$ based on $\delta=4$ and $\Delta_{F\_PUCCH\_1}(F)=-1$ configured by higher layer, to further calculate PUCCH transmit power.

Case II: When PUCCH transmits with a single-antenna port transmission mode:

UE applies $h(n_{CQI}, n_{HARQ}, n_{SR})=0.3 \cdot (n_{HARQ}+n_{SR})-1.5=0.3(12+0)-1.5=2.1$ to calculate the power offset corresponding to PUCCH bearing bit number;

When $\Delta_{F\_PUCCH}(F)$ is configured according to method (1) mentioned above: viz. adopting the same $\Delta_{F\_PUCCH}(F)$ parameter value for both single-antenna port transmission mode and sending grading mode, UE shall adopt $\Delta_{F\_PUCCH\_2}(F)=3$ configured by higher layer, to further calculate PUCCH transmit power;

When $\Delta_{F\_PUCCH}(F)$ is configured according to method (2) mentioned above: viz. adopting the same $\Delta_{F\_PUCCH}(F)$ parameter value for both single-antenna port transmission mode and sending grading mode, UE shall obtain $\Delta_{F\_PUCCH\_2}(F)=\Delta_{F\_PUCCH\_1}(F)+\delta=-1+4=3$ based on $\delta=4$ and $\Delta_{F\_PUCCH\_1}(F)=-1$ configured by higher layer, to further calculate PUCCH transmit power;

When $\Delta_{F\_PUCCH}(F)$ is configured according to method (3) mentioned above: viz. only distinguishing PUCCH transmission mode when the number of bits of uplink control information is smaller than or equal to 11 bits, but not distinguishing when it is larger than 11 bits, UE shall adopt $\Delta_{F\_PUCCH\_2}(F)=3$ configured by higher layer, to further calculate PUCCH transmit power;

When $\Delta_{F\_PUCCH}(F)$ is configured according to method (3-3) mentioned above: only distinguishing PUCCH transmission mode when the number of bits of uplink control information is smaller than or equal to 11 bits, but not distinguishing when it is larger than 11 bits, UE shall obtain $\Delta_{F\_PUCCH\_2}(F)=\Delta_{F\_PUCCH\_1\_1}(F)+\delta_2=-1+4=3$ based on $\delta_2=4$ and $\Delta_{F\_PUCCH\_1\_1}(F)=-1$ configured by higher layer, to further calculate PUCCH transmit power;

When $\Delta_{F\_PUCCH}(F)$ is configured according to method (4) mentioned above: viz. only distinguishing PUCCH transmission mode when the number of bits of uplink control information is larger than 11 bits, but not distinguishing when it is smaller than or equal to 11 bits, UE shall adopt $\Delta_{F\_PUCCH\_2\_1}(F)=3$ configured by higher layer, to further calculate PUCCH transmit power;

When $\Delta_{F\_PUCCH}(F)$ is configured according to method (4-3) mentioned above: viz. only distinguishing PUCCH transmission mode when the number of bits of uplink control information is larger than 11 bits, but not distinguishing when it is smaller than or equal to 11 bits, UE shall obtain $\Delta_{F\_PUCCH\_2\_1}(F)=\Delta_{F\_PUCCH\_1}(F)+\delta_1=-1+4=3$ based on $\delta_1=4$ and $\Delta_{F\_PUCCH\_1}(F)=-1$ configured by higher layer, to further calculate PUCCH transmit power;

When $\Delta_{F\_PUCCH}(F)$ is configured according to method (5) mentioned above: viz. distinguishing PUCCH transmission mode when the number of bits of uplink control information is both smaller than or equal to 11 bits and larger than 11 bits, UE shall adopt $\Delta_{F\_PUCCH\_2\_1}(F)=3$ configured by higher layer, to further calculate PUCCH transmit power;

When $\Delta_{F\_PUCCH}(F)$ is configured according to method (5-3) mentioned above: viz. distinguishing PUCCH transmission mode when the number of bits of uplink control information is both smaller than or equal to 11 bits and larger than 11 bits, UE shall obtain $\Delta_{F\_PUCCH\_2\_1}(F)=\Delta_{F\_PUCCH\_1\_1}(F)+\delta_2=-1+4=3$ based on $\delta_2=4$ and $\Delta_{F\_PUCCH\_1\_1}(F)=-1$ configured by higher layer, to further calculate PUCCH transmit power.

Case III: If PUCCH transmits with a multi-antenna port transmission mode:

UE adopts $h(n_{CQI}, n_{HARQ}, n_{SR})=0.25\cdot(n_{HARQ}+n_{SR})-0.75=0.25(12+0)-0.75=2.25$ to calculate the power offset corresponding to PUCCH bearing bit number;

When $\Delta_{F\_PUCCH}(F)$ is configured according to method (1) mentioned above: viz. adopting the same $\Delta_{F\_PUCCH}(F)$ parameter value for both single-antenna port transmission mode and sending grading mode, UE shall adopt $\Delta_{F\_PUCCH\_2}(F)=3$ configured by higher layer, to further calculate PUCCH transmit power;

When $\Delta_{F\_PUCCH}(F)$ is configured according to method (2) mentioned above: viz. adopting the same $\Delta_{F\_PUCCH}(F)$ parameter value for both single-antenna port transmission mode and sending grading mode, UE shall obtain $\Delta_{F\_PUCCH\_2}(F)=\Delta_{F\_PUCCH\_1}(F)+\delta=-1+4=3$ based on $\delta=4$ and $\Delta_{F\_PUCCH\_1}(F)=-1$ configured by higher layer, to further calculate PUCCH transmit power.

When $\Delta_{F\_PUCCH}(F)$ is configured according to method (3) mentioned above: viz. only distinguishing PUCCH transmission mode when the number of bits of uplink control information is smaller than or equal to 11 bits, but not distinguishing when it is larger than 11 bits, UE shall adopt $\Delta_{F\_PUCCH\_2}(F)=3$ configured by higher layer, to further calculate PUCCH transmit power;

When $\Delta_{F\_PUCCH}(F)$ is configured according to method (3-3) mentioned above: viz. only distinguishing PUCCH transmission mode when the number of bits of uplink control information is smaller than or equal to 11 bits, but not distinguishing when it is larger than 11 bits, UE shall obtain $\Delta_{F\_PUCCH\_2}(F)=\Delta_{F\_PUCCH\_1\_1}(F)+\delta_2=-1+4=3$ based on $\delta_2=4$ and $\Delta_{F\_PUCCH\_1\_1}(F)=-1$ configured by higher layer, to further calculate PUCCH transmit power;

When $\Delta_{F\_PUCCH}(F)$ is configured according to method (4) mentioned above: viz. only distinguishing PUCCH transmission mode when the number of bits of uplink control information is larger than 11 bits, but not distinguishing when it is smaller than or equal to 11 bits, UE shall adopt $\Delta_{F\_PUCCH\_2\_2}(F)=2$ configured by higher layer, to further calculate PUCCH transmit power;

When $\Delta_{F\_PUCCH}(F)$ is configured according to method (4-3) mentioned above: viz. only distinguishing PUCCH transmission mode when the number of bits of uplink control information is larger than 11 bits, but not distinguishing when it is smaller than or equal to 11 bits, UE shall obtain $\Delta_{F\_PUCCH\_2\_2}(F)=\Delta_{F\_PUCCH\_1}(F)+\delta_2=1+3=2$ based on $\delta_2=3$ and $\Delta_{F\_PUCCH\_1}(F)=-1$ configured by higher layer, to further calculate PUCCH transmit power;

When $\Delta_{F\_PUCCH}(F)$ is configured according to method (5) mentioned above: viz. distinguishing PUCCH transmission mode when the number of bits of uplink control information is both smaller than or equal to 11 bits and larger than 11 bits, UE shall adopt $\Delta_{F\_PUCCH\_2\_2}(F)=2$ configured by higher layer, to further calculate PUCCH transmit power;

When $\Delta_{F\_PUCCH}(F)$ is configured according to method (5-3) mentioned above: viz. distinguishing PUCCH transmission mode when the number of bits of uplink control information is both smaller than or equal to 11 bits and larger than 11 bits, UE shall obtain $\Delta_{F\_PUCCH\_2\_2}(F)=\Delta_{F\_PUCCH\_1\_1}(F)+\delta_3=-1+3=2$ based on $\delta_3=3$ and $\Delta_{F\_PUCCH\_1\_1}(F)=-1$ configured by higher layer, to further calculate PUCCH transmit power.

Figure 6:
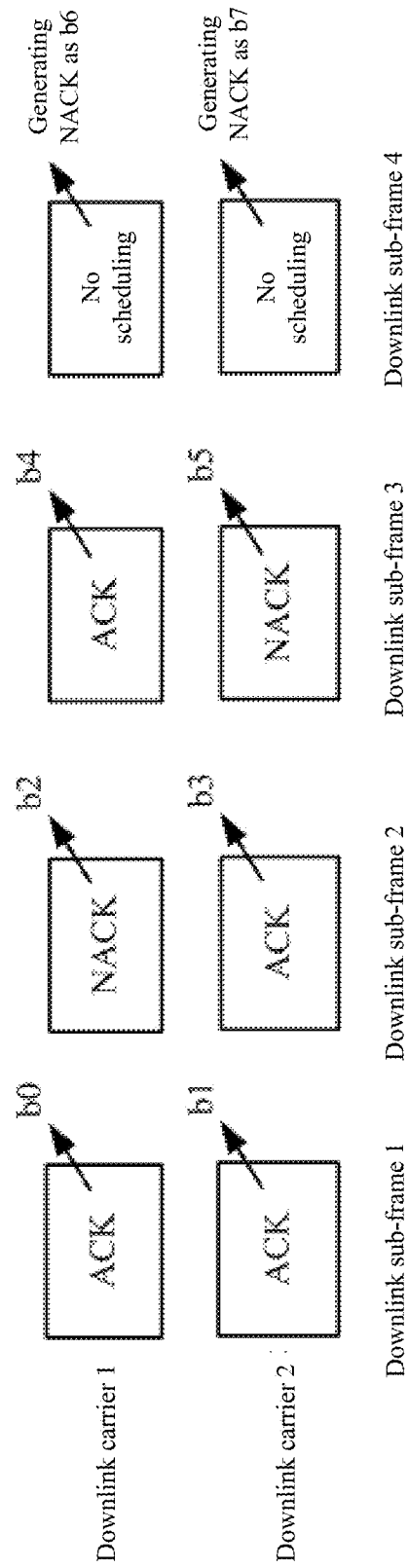
FIG. 6 is the flow diagram of uplink power control under Scene II in the embodiments of the present invention.

Scene II: When two downlink carriers are configured for UE and single-codeword transmission mode is adopted, M=4, viz. UE needs to feed back the ACK/NACK feedback information of four downlink sub-frames in the current uplink sub-frame. If according to UE configuration, UE needs to feed back 8 bits ACK/NACK information, viz. smaller than 11 bits. As shown in FIG. 6, PUCCH format 3 is adopted to transmit ACK/NACK, with the specific power control process as below: Processing operations of base station end are the same as the corresponding operations in scene I, which will not be described here.

UE end: perform uplink power control, specifically process as follows for different cases:

Case I: Whether PUCCH adopts single-antenna port transmission mode or multi-antenna port transmission mode, UE selects the corresponding $\Delta_{F\_PUCCH}(F)$ and $h(n_{CQI}, n_{HARQ}, n_{SR})$ function when the number of bits of uplink control information is smaller than or equal to 11 bits, to calculate PUCCH transmit power, viz.:

UE adopts $h(n_{CQI}, n_{HARQ}, n_{SR})=0.5\cdot(n_{HARQ}+n_{SR})-1.3=0.5(6+0)-1.3=1.7$ to calculate the power offset corresponding to PUCCH bearing bit number;

When $\Delta_{F\_PUCCH}(F)$ is configured according to method (1) or method (2) mentioned above: UE shall adopt $\Delta_{F\_PUCCH\_1}(F)=-1$ configured by higher layer, to further calculate PUCCH transmit power;

Case II: If PUCCH transmits with a single-antenna port transmission mode:

UE adopts $h(n_{CQI}, n_{HARQ}, n_{SR})=0.5\cdot(n_{HARQ}+n_{SR})-1.3=0.5(6+0)-1.3=1.7$ to calculate the power offset corresponding to PUCCH bearing bit number;

When $\Delta_{F\_PUCCH}(F)$ is configured according to method (1) or method (2) mentioned above: viz. adopting the same $\Delta_{F\_PUCCH}(F)$ parameter value for both single-antenna port transmission mode and sending grading mode, UE shall adopt $\Delta_{F\_PUCCH\_1}(F)=-1$ configured by higher layer, to further calculate PUCCH transmit power;

When $\Delta_{F\_PUCCH}(F)$ is configured according to method (3) or method (3-3) mentioned above, viz. only distinguishing PUCCH transmission mode when the number of bits of uplink control information is smaller than or equal to 11 bits, but not distinguishing when it is larger than 11 bits, UE shall adopt $\Delta_{F\_PUCCH\_1\_1}(F)=-1$ configured by higher layer, to further calculate PUCCH transmit power;

When $\Delta_{F\_PUCCH}(F)$ is configured according to method (4) or method (4-3) mentioned above, viz. only distinguishing PUCCH transmission mode when the number of bits of uplink control information is larger than 11 bits, but not distinguishing when it is smaller than or equal to 11 bits, UE shall adopt $\Delta_{F\_PUCCH\_1}(F)=-1$ configured by higher layer, to further calculate PUCCH transmit power;

When $\Delta_{F\_PUCCH}(F)$ is configured according to method (5) or method (5-3), viz. distinguishing PUCCH transmission mode when the number of bits of uplink control information is both smaller than or equal to 11 bits and larger than 11 bits, UE shall adopt $\Delta_{F\_PUCCH\_1\_1}(F)=-1$ configured by higher layer, to further calculate PUCCH transmit power;

Case III: If PUCCH transmits with a multi-antenna port transmission mode:

UE adopts $h(n_{CQI}, n_{HARQ}, n_{SR})=0.35\cdot(n_{HARQ}+n_{SR})-0.6=0.35(6+0)-0.6=1.5$ to calculate the power offset corresponding to PUCCH bearing bit number;

When $\Delta_{F\_PUCCH}(F)$ is configured according to method (1) or method (2): viz. adopting the same $\Delta_{F\_PUCCH}(F)$ parameter value for both single-antenna port transmission mode and sending grading mode, UE shall adopt $\Delta_{F\_PUCCH\_1}(F)=-1$ configured by higher layer, to further calculate PUCCH transmit power;

When $\Delta_{F\_PUCCH}(F)$ is configured according to method (3): viz. only distinguishing PUCCH transmission mode when the number of bits of uplink control information is smaller than or equal to 11 bits, but not distinguishing when it is larger than 11 bits, UE shall adopt $\Delta_{F\_PUCCH\_1\_2}(F)=-2$ configured by higher layer, to further calculate PUCCH transmit power;

When $\Delta_{F\_PUCCH}(F)$ is configured according to method (3-3) mentioned above: viz. only distinguishing PUCCH transmission mode when the number of bits of uplink control information is smaller than or equal to 11 bits, but not distinguishing when it is larger than 11 bits, UE shall obtain $\Delta_{F\_PUCCH\_1\_2}(F)=\Delta_{F\_PUCCH\_1\_1}(F)+\delta_1=-1+-1=-2$ based on $\delta_1=-1$ and $\Delta_{F\_PUCCH\_1\_1}(F)=-1$ configured by higher layer, to further calculate PUCCH transmit power;

When $\Delta_{F\_PUCCH}(F)$ is configured according to method (4) or method (4-3): viz. only distinguishing PUCCH transmission mode when the number of bits of uplink control information is larger than 11 bits, but not distinguishing when it is smaller than or equal to 11 bits, UE shall adopt $\Delta_{F\_PUCCH\_1}(F)=-1$ configured by higher layer, to further calculate PUCCH transmit power;

When $\Delta_{F\_PUCCH}(F)$ is configured according to method (5) mentioned above: viz. distinguishing PUCCH transmission mode when the number of bits of uplink control information is both smaller than or equal to 11 bits and larger than 11 bits, UE shall adopt $\Delta_{F\_PUCCH\_1\_2}(F)=-2$ configured by higher layer, to further calculate PUCCH transmit power;

When $\Delta_{F\_PUCCH}(F)$ is configured according to method (5-3): viz. distinguishing PUCCH transmission mode when the number of bits of uplink control information is both smaller than or equal to 11 bits and larger than 11 bits, UE shall obtain $\Delta_{F\_PUCCH\_1\_2}(F)=\Delta_{F\_PUCCH\_1\_1}(F)+\delta_1=-1-1=-2$ based on $\delta_1=-1$ and $\Delta_{F\_PUCCH\_1\_1}(F)=-1$ configured by higher layer, to further calculate PUCCH transmit power.

It should be noted that it is described by taking ACK/NACK feedback information as the example in the aforementioned embodiments, which is also applicable to the conditions when PUCCH sending other feedback information.

It can be learnt from the above descriptions that, in LTE-A system, the method of adopting different $\Delta_{F\_PUCCH}(F)$ and $h(n_{CQI}, n_{HARQ}, n_{SR})$ functions to calculate PUCCH transmit power according to bit number of uplink feedback information and/or PUCCH transmission mode can guarantee that UE sends data by proper power, thus avoiding power waste and improving UE power utilization.

Based on same technological idea, the embodiments of the present invention also put forward a kind of user equipment applicable to the above process, and also a network-side device.

Figure 7:
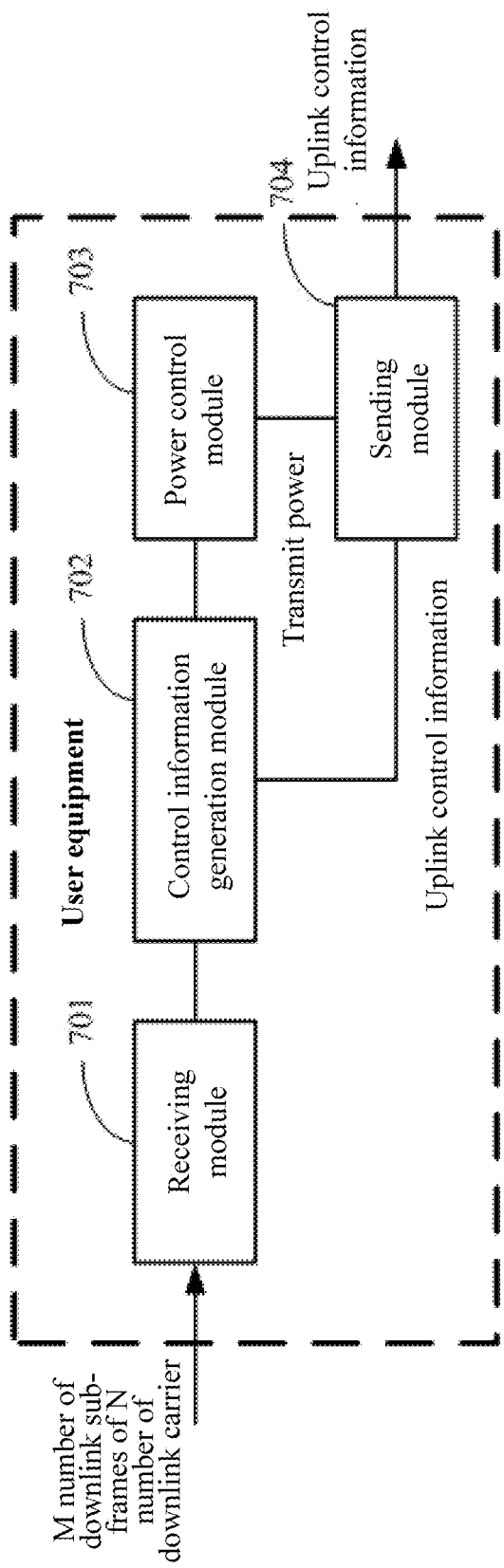
FIG. 7 is the structure diagram of user equipment provided in the embodiments of the present invention.

As shown in FIG. 7, the user equipment provided by the embodiments of the present invention includes:

Receiving module 701, used for receiving data in M downlink sub-frames of N downlink carriers, wherein, N≥1 and M≥1;

Control information generation module 702, used for generating uplink control information of the M downlink sub-frames that can be transmitted in one uplink sub-frame;

Power control module 703, used to determine $\Delta_{F\_PUCCH}(F)$ and h(n) for calculating PUCCH transmit power according to whether the number of bits of the uplink control information generated based on the control information generation module is larger than a predefined threshold, and calculates the transmit power used to send the uplink control information on PUCCH based on the determined $\Delta_{F\_PUCCH}(F)$ and h(n); wherein, the $\Delta_{F\_PUCCH}(F)$ represents the power offset of PUCCHs in different formats relative to PUCCH format 1a, and the h(n) represents the power offset corresponding to the number of transmission bits of the PUCCH; Sending module 704, used for sending the generated uplink control information on PUCCH by applying the calculated transmit power.

In the above user equipment, power control module 703 is specifically used for determining $\Delta_{F\_PUCCH}(F)=\Delta_{F\_PUCCH\_1}(F)$ and $h(n)=h_1(n)=a_1\cdot n+b_1$ when the number of bits of uplink control information is not larger than the predefined threshold, wherein $a_1$ and $b_1$ are the coefficient values of $h_1(n)$ function, or determining $\Delta_{F\_PUCCH}(F)$ and h(n) based on PUCCH transmission mode; viz. determining $\Delta_{F\_PUCCH}(F)$ as the corresponding $\Delta_{F\_PUCCH}(F)$ when the number of bits of uplink control information is not larger than the predefined threshold, wherein h(n) refers to the corresponding $h_1(n)=a_1\cdot n+b_1$ when the number of bits of uplink control information is not larger than the predefined threshold;

Determine $\Delta_{F\_PUCCH}(F)=\Delta_{F\_PUCCH\_2}(F)$ and $h(n)=h_2(n)=a_2\cdot n+b_2$ when the number of bits of uplink control information is larger than the predefined threshold, wherein $a_2$ and $b_2$ are the coefficient values of $h_2(n)$ function, or determine $\Delta_{F\_PUCCH}(F)$ and h(n) based on PUCCH transmission mode; viz. determining $\Delta_{F\_PUCCH}(F)$ as the corresponding $\Delta_{F\_PUCCH\_2}(F)$ when the number of bits of uplink control information is larger than the predefined threshold, h(n) refers to the corresponding $h_2(n)=a_2 \cdot n+b_2$ when the number of bits of uplink control information is larger than the predefined threshold.

To be specific, power control module 703 determines $h_1(n)=0.5 \cdot n-1.3$ according to the determined $\Delta_{F\_PUCCH\_1}(F) \in \{-1,0,1,2\}$ dB.

To be specific, power control module 703 determines $h_2(n)=0.25 \cdot n-0.75$ according to the determined $\Delta_{F\_PUCCH\_2}(F) \in \{2,3,4,5\}$ dB or $\Delta_{F\_PUCCH\_2}(F) \in \{3,4,5,6\}$ dB.

The above power control module 703 can also obtain $\Delta_{F\_PUCCH}(F)$ by one of the following modes:

Mode I: Receive the two $\Delta_{F\_PUCCH}(F)$ parameter values pre-configured by higher layer signaling, $\Delta_{F\_PUCCH\_1}(F)$ and $\Delta_{F\_PUCCH\_2}(F)$;

Mode II: Receive one $\Delta_{F\_PUCCH}(F)$ value pre-configured by higher layer signaling, and obtain the rest $\Delta_{F\_PUCCH}(F)$ values based on the configured $\Delta_{F\_PUCCH}(F)$ value and one δ value; wherein δ refers to the predefined offset or the offset pre-configured by higher layer signaling.

In the above user equipment, power control module 703 is specifically used for determining $\Delta_{F\_PUCCH}(F)$ and h(n) as the $\Delta_{F\_PUCCH\_1\_1}(F)$ and $h_{1\_1}(n)=a_{1\_1} \cdot n+b_{1\_1}$ corresponding to single-antenna port transmission if PUCCH transmits information with a single-antenna port transmission mode when the number of bits of uplink control information is not larger than the predefined threshold, wherein $a_{1\_1}$ and $b_{1\_1}$ are the coefficient values of $h_{1\_1}(n)$ function; and determining $\Delta_{F\_PUCCH}(F)$ and h(n) as the corresponding $\Delta_{F\_PUCCH\_1\_2}(F)$ and $h_{1\_2}(n)=a_{1\_2} \cdot n+b_{1\_2}$ of multi-antenna port transmission mode if PUCCH transmits information with a multi-antenna port transmission mode, wherein $a_{1\_2}$ and $b_{1\_2}$ refer to the coefficient values of $h_{1\_2}(n)$ function.

To be specific, power control module 703 determines $h_{1\_1}(n)=0.5 \cdot n-1.3$ according to the determined $\Delta_{F\_PUCCH\_1\_1}(F) \in \{1,0,1,2\}$ dB.

To be specific, power control module 703 determines $h_{1\_2}(n)=0.35 \cdot n-0.6$ according to the determined $\Delta_{F\_PUCCH\_1\_2}(F) \in \{-1,0,1,2\}$ dB or $\Delta_{F\_PUCCH\_1\_2}(F) \in \{-2,-1,0,1\}$ dB.

In the above user equipment, power control module 703 is specifically used for determining $\Delta_{F\_PUCCH}(F)$ and h(n) as the $\Delta_{F\_PUCCH\_2\_1}(F)$ and $h_{2\_1}(n)=a_{2\_1} \cdot n+b_{2\_1}$ corresponding to single-antenna port transmission if PUCCH transmits information with a single-antenna port transmission mode when the number of bits of uplink control information is larger than the predefined threshold, wherein $a_{2\_1}$ and $b_{2\_1}$ are the coefficient values of $h_{2\_1}(n)$ function; and determining $\Delta_{F\_PUCCH}(F)$ and h(n) as the corresponding $\Delta_{F\_PUCCH\_2\_2}(F)$ and $h_{2\_2}(n)=a_{2\_2} \cdot n+b_{2\_2}$ of multi-antenna port transmission mode if PUCCH transmits information with a multi-antenna port transmission mode, wherein $a_{2\_2}$ and $b_{2\_2}$ refer to the coefficient values of $h_{2\_2}(n)$ function.

To be specific, power control module 703 determines $h_{2\_1}(n)=0.3 \cdot n-1.5$ according to the determined $\Delta_{F\_PUCCH\_2\_1}(F) \in \{3,4,5,6\}$ dB.

To be specific, power control module determines $h_{2\_2}(n)=0.25 \cdot n-0.75$ according to the determined $\Delta_{F\_PUCCH\_2\_2}(F) \in \{2,3,4,5\}$ dB or $\Delta_{F\_PUCCH\_2\_2}(F) \in \{3,4,5,6\}$ dB.

In the above user equipment, power control module 703 obtains $\Delta_{F\_PUCCH}(F)$ by the following methods;

Mode III: Receive the three $\Delta_{F\_PUCCH}(F)$ values, $\Delta_{F\_PUCCH\_1\_1}(F)$, $\Delta_{F\_PUCCH\_1\_2}(F)$ and $\Delta_{F\_PUCCH\_2}(F)$, which are pre-configured by higher layer signaling.

In the above user equipment, power control module 703 obtains $\Delta_{F\_PUCCH}(F)$ by the following methods:

Mode IV: Receive the three $\Delta_{F\_PUCCH}(F)$ values, $\Delta_{F\_PUCCH\_1}(F)$, $\Delta_{F\_PUCCH\_2\_1}(F)$ and $\Delta_{F\_PUCCH\_2\_2}(F)$, which are pre-configured by higher layer signaling.

In the above user equipment, power control module 703 obtains $\Delta_{F\_PUCCH}(F)$ by one of the following methods:

Mode V: Receive the four $\Delta_{F\_PUCCH}(F)$ values, $\Delta_{F\_PUCCH\_1\_1}(F)$, $\Delta_{F\_PUCCH\_1\_2}(F)$, $\Delta_{F\_PUCCH\_2\_1}(F)$ and $\Delta_{F\_PUCCH\_2\_2}(F)$, which are pre-configured by higher layer signaling;

Mode VI: Receive at least one $\Delta_{F\_PUCCH}(F)$ pre-configured by higher layer signaling, and obtain the rest $\Delta_{F\_PUCCH}(F)$ values according to at least one configured $\Delta_{F\_PUCCH}(F)$ and at least one δ value, $\Delta_{F\_PUCCH\_1}(F) \Delta_{F\_PUCCH\_1}(F)$;

Therein, δ refers to the predefined offset or the offset pre-configured by higher layer signaling.

In the above user equipment, in the $n=n_{HARQ}+n_{SR}$, $n_{HARQ}$ corresponds to the ACK/NACK bit number used to calculate h(n), and $n_{SR}=\{0,1\}$ means whether SR transmission exists in the current uplink sub-frame.

In the above user equipment, the value of predefined threshold is 11.

In the above user equipment, the uplink control information includes one of the following information: ACK/NACK feedback information, CQI/PMI/RI/PTI feedback information and SR information.

In the above user equipment, the uplink control information refers to the bundled uplink control information.

Figure 8:
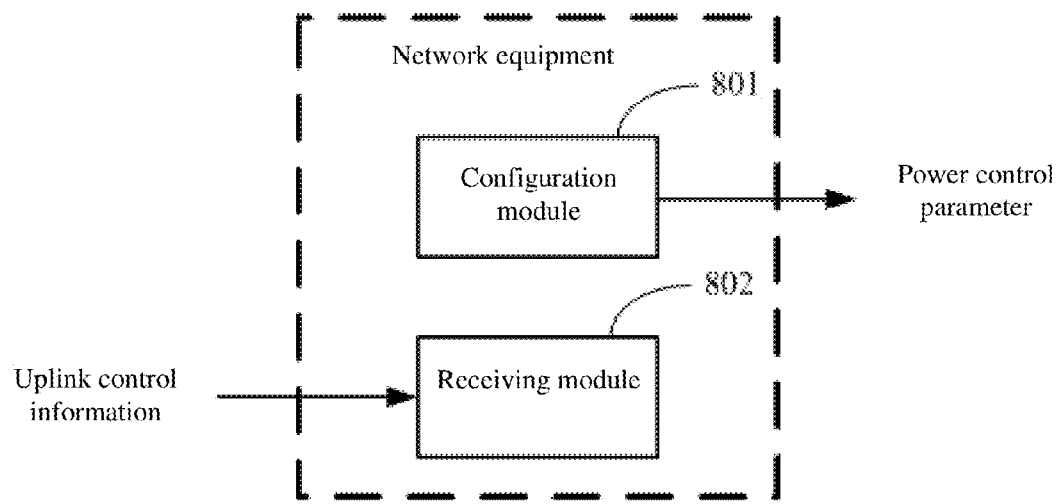
FIG. 8 is the structure diagram of network equipment provided in the embodiments of the present invention.

As shown in FIG. 8, the network equipment provided by the embodiments of the present invention can be base station equipment, which can include:

Configuration module 801, used for configuring the $\Delta_{F\_PUCCH}(F)$ parameter of transmit power of uplink control channel to user equipment, and the $\Delta_{F\_PUCCH}(F)$ represents the power offset of PUCCHs in different formats relative to PUCCH format 1a;

Receiving module 802, used for receiving the uplink control information sent by the user equipment on PUCCH, wherein, the transmit power on PUCCH is determined by the user equipment according to the configured $\Delta_{F\_PUCCH}(F)$.

In the above network equipment, configuration module 801 can configure $\Delta_{F\_PUCCH}(F)$ parameter to user equipment by one of the following modes:

Mode I: Pre-configure two $\Delta_{F\_PUCCH}(F)$ values, $\Delta_{F\_PUCCH\_1}(F)$ and $\Delta_{F\_PUCCH\_2}(F)$, to user equipment through higher layer signaling;

Mode II: Pre-configure one $\Delta_{F\_PUCCH}(F)$ value to user equipment through higher layer signaling, and obtain the rest $\Delta_{F\_PUCCH}(F)$ values based on the configured $\Delta_{F\_PUCCH}(F)$ value and one δ value;

Mode III: Pre-configure three $\Delta_{F\_PUCCH}(F)$ values, $\Delta_{F\_PUCCH\_1\_1}(F)$, $\Delta_{F\_PUCCH\_1\_2}(F)$ and $\Delta_{F\_PUCCH\_2}(F)$, to user equipment through higher layer signaling;

Mode IV: Pre-configure three $\Delta_{F\_PUCCH}(F)$ values, $\Delta_{F\_PUCCH\_1}(F)$, $\Delta_{F\_PUCCH\_2\_1}(F)$ and $\Delta_{F\_PUCCH\_2\_2}(F)$, to user equipment through higher layer signaling;

Mode V: Pre-configure four $\Delta_{F\_PUCCH}(F)$ values, $\Delta_{F\_PUCCH\_1\_1}(F)$, $\Delta_{F\_PUCCH\_1\_2}(F)$, $\Delta_{F\_PUCCH\_2\_1}(F)$ and $\Delta_{F\_PUCCH\_2\_2}(F)$, to user equipment through higher layer signaling;

Mode VI: Pre-configure at least one $\Delta_{F\_PUCCH}(F)$ to user equipment through higher layer signaling, and obtain the rest $\Delta_{F\_PUCCH}(F)$ values based on at least one configured $\Delta_{F\_PUCCH}(F)$ and at least one δ value;

Therein, $\Delta_{F\_PUCCH\_1}(F)$ is the $\Delta_{F\_PUCCH}(F)$ parameter value when the number of bits of uplink control information is not larger than the predefined threshold when transmission mode is not distinguished, $\Delta_{F\_PUCCH\_2}(F)$ refers to $\Delta_{F\_PUCCH}(F)$ parameter value when the number of bits of uplink control information is larger than the predefined threshold when transmission mode is not distinguished, $\Delta_{F\_PUCCH\_1\_1}(F)$ represents the corresponding $\Delta_{F\_PUCCH}(F)$ parameter value when the number of bits of uplink control information is not larger than the predefined threshold and PUCCH adopts single-antenna port transmission mode, $\Delta_{F\_PUCCH\_1\_2}(F)$ is the corresponding $\Delta_{F\_PUCCH}(F)$ parameter value when the number of bits of uplink control information is not larger than the predefined threshold and PUCCH adopts multi-antenna port transmission mode, $\Delta_{F\_PUCCH\_2\_1}(F)$ refers to the corresponding $\Delta_{F\_PUCCH}(F)$ parameter value when the number of bits of uplink control information is larger than the predefined threshold and PUCCH adopts single-antenna port transmission mode, $\Delta_{F\_PUCCH\_2\_2}(F)$ represents the corresponding $\Delta_{F\_PUCCH}(F)$ parameter value when the number of bits of uplink control information is larger than the predefined threshold and PUCCH adopts multi-antenna port transmission mode, and δ refers to the predefined offset or the offset pre-configured by higher layer signaling. Through the description of the embodiments above, the technical personnel in this field can understand clearly that the present invention can be implemented by software and necessary general hardware platform or hardware (the former is better in most cases). Based on this understanding, the technical program or the part making contributions to the prior art of the present invention can be embodied by a form of software products essentially which can be stored in a storage medium, including a number of instructions for making a terminal device (such as cell phone, personal computers, servers, or network equipments, etc.) implement the methods described in the embodiments of the present invention.

The descriptions above are just preferred implement ways of the present invention. It should be pointed that, for general technical personnel in this field, some improvement and decorating can be done without deviating from the principle of the present invention, which should be as the protection scope of the present invention.

The invention claimed is:

1. An uplink power control method performed on a user equipment, comprising:
   receiving data in M downlink sub-frames of N downlink carriers and generating uplink control information, where N≥1, M≥1, and the uplink control information of the M downlink sub-frames is transmitted in one uplink sub-frame;
   determining $\Delta_{F\_PUCCH}(F)$ and h(n) which are used to calculate transmit power of a physical uplink control channel (PUCCH) according to whether a number of bits of the uplink control information is larger than a predefined threshold, where $\Delta_{F\_PUCCH}(F)$ represents power offset of different PUCCH formats relative to PUCCH format 1a, and h(n) represents power offset corresponding to a number of transmission bits of the PUCCH; and
   calculating the PUCCH transmit power according to the determined $\Delta_{F\_PUCCH}(F)$ and h(n) and sending the generated uplink control information on the PUCCH using the calculated transmit power,
   wherein $n=n_{HARQ}+n_{SR}$, $n_{HARQ}$ corresponds to a bit number of ACK/NACK used for calculating h(n) and $n_{SR}=\{0,1\}$ represents whether SR transmission exists in a current uplink sub-frame, and
   a value of the predefined threshold is equal to 11.

2. The method according to claim 1, wherein, determining $\Delta_{F\_PUCCH}(F)$ and h(n) for calculating the transmit power of the PUCCH according to whether the number of bits of the uplink control information is larger than a predefined threshold, comprises:
   when the number of bits of the uplink control information is not larger than the predefined threshold, determining $\Delta_{F\_PUCCH}(F)=\Delta_{F\_PUCCH\_1}(F)$ and $h(n)=h_1(n)=a_1 \cdot n+b_1$, where a1 and b1 refer to coefficient values of the $h_1(n)$ function, or determining $\Delta_{F\_PUCCH}(F)$ and h(n) based on a PUCCH transmission mode; and
   when the number of bits of the uplink control information is larger than the predefined threshold, determining $\Delta_{F\_PUCCH}(F)=\Delta_{F\_PUCCH\_2}(F)$ and $h(n)=h_2(n)=a_2 \cdot n+b_2$, where a2 and b2 refer to coefficient values of the $h_2(n)$ function, or determining $\Delta_{F\_PUCCH}(F)$ and h(n) based on the PUCCH transmission mode.

3. The method according to any of claim 2, wherein determining $\Delta_{F\_PUCCH}(F)$ is performed through one of the following modes:
   Mode I: receiving two $\Delta_{F\_PUCCH}(F)$ values, $\Delta_{F\_PUCCH\_1}(F)$ and $\Delta_{F\_PUCCH\_2}(F)$ which are pre-configured by higher layer signaling; and
   Mode II: receiving one $\Delta_{F\_PUCCH}(F)$ value pre-configured by higher layer signaling, and obtaining a remainder of $\Delta_{F\_PUCCH}(F)$ values based on the pre-configured $\Delta_{F\_PUCCH}(F)$ value and one δ value,
   wherein δ refers to a predefined offset or an offset pre-configured by higher layer signaling.

4. The method according to claim 1, wherein:
   when the number of bits of the uplink control information is not larger than the predefined threshold, determining $\Delta_{F\_PUCCH}(F)$ and h(n) based on the PUCCH transmission mode comprises:
      when the PUCCH transmits information with a single-antenna port transmission mode, $\Delta_{F\_PUCCH}(F)$ and h(n) refer to $\Delta_{F\_PUCCH\_1\_1}(F)$ and $h_{1\_1}(n)=a_{1\_1} \cdot n+b_{1\_1}$ corresponding to the single-antenna port transmission mode, where a1_1 and b1_1 are coefficient values of the $h_{1\_1}(n)$ function; and
      when the PUCCH transmits information with a multi-antenna port transmission mode, $\Delta_{F\_PUCCH}(F)$ and h(n) refer to $\Delta_{F\_PUCCH\_1\_2}(F)$ and $h_{1\_2}(n)=a_{1\_2} \cdot n+b_{1\_2}$ corresponding to the multi-antenna port transmission mode, where a1_2 and b1_2 are coefficient values of the $h_{1\_2}(n)$ function; and
   when the number of bits of the uplink control information is larger than the predefined threshold, $\Delta_{F\_PUCCH}(F)$ and h(n) are determined based on PUCCH transmission mode, which comprises:
      when the PUCCH transmits information with a single-antenna port transmission mode, the $\Delta_{F\_PUCCH}(F)$ and h(n) refer to $\Delta_{F\_PUCCH\_2\_1}(F)$ and $h_{2\_1}(n)=a_{2\_1} \cdot n+b_{2\_1}$ corresponding to the single-antenna port transmission mode, where a2_1 and b2_1 are coefficient values of the $h_{2\_1}(n)$ function; and
      when the PITCH transmits information with a multi-antenna port transmission mode, the $\Delta_{F\_PUCCH}(F)$ and h(n) refer to $\Delta_{F\_PUCCH\_2\_2}(F)$ and $h_{2\_2}(n)=a_{2\_2} \cdot n+b_{2\_2}$ corresponding to the multi-antenna port transmission mode, where a2_2 and b2_2 are coefficient values of the $h_{2\_2}(n)$ function.

5. The method according to claim 4, wherein, determining $\Delta_{F\_PUCCH}(F)$ is performed through one of the following modes:
   Mode III: receiving three $\Delta_{F\_PUCCH}(F)$ values, $\Delta_{F\_PUCCH\_1\_1}(F)$, $\Delta_{F\_PUCCH\_1\_2}(F)$ and $\Delta_{F\_PUCCH\_2}(F)$, which are pre-configured by higher layer signaling;

Mode IV: receiving three $\Delta_{F\_PUCCH}(F)$ values, $\Delta_{F\_PUCCH\_1}(F)$, $\Delta_{F\_PUCCH\_2\_1}(F)$ and $\Delta_{F\_PUCCH\_2\_2}(F)$, which are pre-configured by higher layer signaling;

Mode V: receiving four $\Delta_{F\_PUCCH}(F)$ values, $\Delta_{F\_PUCCH\_1\_1}(F)$, $\Delta_{F\_PUCCH\_1\_2}(F)$, $\Delta_{F\_PUCCH\_2\_1}(F)$ and $\Delta_{F\_PUCCH\_2\_2}(F)$, which are pre-configured by higher layer signaling; and Mode VI: receiving at least one $\Delta_{F\_PUCCH}(F)$ pre-configured by higher layer signaling, and obtaining a remainder of $\Delta_{F\_PUCCH}(F)$ values based on the at least one pre-configured $\Delta_{F\_PUCCH}(F)$ and at least one $\delta$ value;

wherein $\delta$ refers to a predefined offset or an offset pre-configured by higher layer signaling.

6. The method according to claim 1, wherein the uplink control information includes one of the following information:

ACK/NACK feedback information, CQI/PMI/RI/PTI feedback information, and SR information.

7. The method according to claim 1, wherein, the uplink control information refers to the uplink control information after bundling.

8. The method according to claim 1, wherein the PUCCH refers to a PUCCH format 1b channel which is used in PUCCH format 1b with a channel selection transmission scheme, or a channel which is used in the transmission scheme based on a combination of DFT-S-OFDM and time-domain spreading.

9. A user equipment comprising a computer configured to:
receive data in M downlink sub-frames of N downlink carriers, where N≥1 and M≥1;
generate uplink control information of the M downlink sub-frames that can be transmitted in one uplink sub-frame;
determine $\Delta_{F\_PUCCH}(F)$ and h(n) which are used to calculate PUCCH transmit power according to whether a number of bits of the uplink control information generated is larger than a predefined threshold;
calculate the PUCCH transmit power used to send the uplink control information on the PUCCH based on the determined $\Delta_{F\_PUCCH}(F)$ and h(n), where $\Delta_{F\_PUCCH}(F)$ represents power offset of different PUCCH formats relative to PUCCH format 1a, and h(n) represents a power offset corresponding to a number of transmission bits of the PUCCH;
send the generated uplink control information on the PUCCH using the calculated transmit power,
wherein n=$n_{HARQ}$+$n_{SR}$, $n_{HARQ}$ corresponds to a bit number of ACK/NACK used for calculating h(n) and $n_{SR}=\{0,1\}$ represents whether SR transmission exists in a current uplink sub-frame, and
a value of the predefined threshold is equal to 11.

10. The user equipment according to claim 9, the computer is further configured to:
when the number of bits of the uplink control information is not larger than the predefined threshold, determine $\Delta_{F\_PUCCH}(F)=\Delta_{F\_PUCCH\_1}(F)$ and h(n)=$h_1(n)$=$a_1 \cdot n+b_1(n)$, where a1 and b1 are coefficient values of the $h_1(n)$ function, or determine $\Delta_{F\_PUCCH}(F)$ and h(n) based on PUCCH transmission mode; and
when the number of bits of uplink control information is larger than predefined threshold, determine $\Delta_{F\_PUCCH}(F)=\Delta_{F\_PUCCH\_2}(F)$ and h(n)=$h_2(n)$=$a_2 \cdot n+b_2$, wherein where a2 and b2 are coefficient values of the $h_2(n)$ function, or determine $\Delta_{F\_PUCCH}(F)$ and h(n) based on PUCCH transmission mode.

11. The user equipment according to claim 10, wherein the computer is configured to determine $\Delta_{F\_PUCCH}(F)$ through one of the following modes:

Mode I: receive two $\Delta_{F\_PUCCH}(F)$ values, $\Delta_{F\_PUCCH}(F)$ and $\Delta_{F\_PUCCH\_2}(F)$, which are pre-configured by higher layer signaling; and Mode II: receive one $\Delta_{F\_PUCCH}(F)$ value pre-configured by higher layer signaling, and obtain a remainder of $\Delta_{F\_PUCCH}(F)$ values based on the pre-configured $\Delta_{F\_PUCCH}(F)$ value and one $\delta$ value, wherein $\delta$ refers to a predefined offset or an offset pre-configured by higher layer signaling.

12. The user equipment according to claim 10, wherein the computer is further configured to:
when the number of bits of the uplink control information is not larger than the predefined threshold:
when the PUCCH transmits information with a single-antenna port transmission mode, determine $\Delta_{F\_PUCCH}(F)$ and h(n) as the corresponding $\Delta_{F\_PUCCH\_1\_1}(F)$ and $h_{1\_1}(n)=a_{1\_1} \cdot n+b_{1\_1}$ of single-antenna port transmission mode, where a1_1 and b1_1 are coefficient values of $h_{1\_1}(n)$ function; and
when the PUCCH transmits information with a multi-antenna port transmission mode, determine $\Delta_{F\_PUCCH}(F)$ and h(n) as corresponding $\Delta_{F\_PUCCH\_1\_2}(F)$ and $h_{1\_2}(n)=a_{1\_2} \cdot n+b_{1\_2}$ of multi-antenna port transmission mode, where a1_2 and b1_2 are coefficient values of the $h_{1\_2}(n)$ function; and when the number of bits of the uplink control information is larger than predefined threshold;
when the PUCCH transmits information with a single-antenna port transmission mode, determine $\Delta_{F\_PUCCH}(F)$ and h(n) as corresponding $\Delta_{F\_PUCCH\_2\_1}(F)$ and $h_{2\_1}(n)=a_{2\_1} \cdot n+b_{2\_1}$ of single-antenna port transmission mode, where a2_1 and b2_1 are coefficient values of the $h_{2\_1}(n)$ function; and
when the PUCCH transmits information with a multi-antenna port transmission mode, determine $\Delta_{F\_PUCCH}(F)$ and h(n) as corresponding $\Delta_{F\_PUCCH\_2\_2}(F)$ and $h_{2\_2}(n)=a_{2\_2} \cdot n+b_{2\_2}$ of multi-antenna port transmission mode, where a2_2 and b2_2 are the coefficient values of the $h_{2\_2}(n)$ function.

13. The user equipment according to claim 12, wherein the computer is configured to determine $\Delta_{F\_PUCCH}(F)$ through one of the following modes:

Mode III: receive three $\Delta_{F\_PUCCH}(F)$ values, $\Delta_{F\_PUCCH\_1\_1}(F)$, $\Delta_{F\_PUCCH\_1\_2}(F)$ and $\Delta_{F\_PUCCH\_2}(F)$, which are pre-configured by higher layer signaling;

Mode IV: receive three $\Delta_{F\_PUCCH}(F)$ values, $\Delta_{F\_PUCCH\_1}(F)$, $\Delta_{F\_PUCCH\_2\_1}(F)$ and $\Delta_{F\_PUCCH\_2\_2}(F)$, which are pre-configured by higher layer signaling;

Mode V: the receive four $\Delta_{F\_PUCCH}(F)$ values, $\Delta_{F\_PUCCH\_1\_1}(F)$, $\Delta_{F\_PUCCH\_1\_2}(F)$, $\Delta_{F\_PUCCH\_2\_1}(F)$ and $\Delta_{F\_PUCCH\_2\_2}(F)$, which are pre-configured by higher layer signaling; and Mode VI: Receive at least one $\Delta_{F\_PUCCH}(F)$ pre-configured by higher layer signaling, and obtain other $\Delta_{F\_PUCCH}(F)$ values base on the at least one pre-configured $\Delta_{F\_PUCCH}(F)$ and at least one $\delta$ value, wherein $\delta$ refers to a predefined offset or an offset pre-configured by higher layer signaling.

14. The user equipment according to claim 9, wherein the uplink control information includes one of the following information:

ACK/NACK feedback information, CQI/PMI/RI/PTI feedback information, and SR information; and
the uplink control information after bundling.

* * * * *